United States Patent
Mueck et al.

(10) Patent No.: US 11,832,289 B2
(45) Date of Patent: *Nov. 28, 2023

(54) SAS INTERFERENCE MITIGATION OPTIONS

(71) Applicant: APPLE INC., Cupertino, CA (US)

(72) Inventors: Markus Mueck, Unterhaching (DE); Srikathyayani Srikanteswara, Portland, OR (US); Biljana Badic, Munich (DE)

(73) Assignee: Apple Inc., Cupertino, CA (US)

(*) Notice: Subject to any disclaimer, the term of this patent is extended or adjusted under 35 U.S.C. 154(b) by 53 days.

This patent is subject to a terminal disclaimer.

(21) Appl. No.: 17/554,903

(22) Filed: Dec. 17, 2021

(65) Prior Publication Data

US 2022/0110132 A1    Apr. 7, 2022

Related U.S. Application Data

(63) Continuation of application No. 16/773,497, filed on Jan. 27, 2020, now Pat. No. 11,234,247, which is a
(Continued)

(51) Int. Cl.
*H04W 52/14* (2009.01)
*H04W 72/541* (2023.01)
(Continued)

(52) U.S. Cl.
CPC ........ *H04W 72/541* (2023.01); *H04B 17/345* (2015.01); *H04W 16/14* (2013.01);
(Continued)

(58) Field of Classification Search
CPC ... H04W 16/14; H04W 72/541; H04W 24/02; H04W 52/243; H04W 52/143; H04W 88/08; H04B 17/345
See application file for complete search history.

(56) References Cited

U.S. PATENT DOCUMENTS

| | | | |
|---|---|---|---|
| 2004/0037263 A1 | 2/2004 | Zeira | |
| 2005/0015532 A1* | 1/2005 | Beckett | G06F 13/4295 710/105 |

(Continued)

FOREIGN PATENT DOCUMENTS

| | | |
|---|---|---|
| CN | 2618308 Y | 5/2004 |
| CN | 101110617 A | 1/2008 |

(Continued)

OTHER PUBLICATIONS

Huang, Chen, et al., "Present Status and Development Trends of Interference Management in Heterogeneous Networks"; Journal of Chongqing University of Posts and Telecommunications (Natural Science Edition); vol. 27, No. 3; Jun. 2015; 12 pgs. (English Abstract included).

(Continued)

*Primary Examiner* — Chi Ho A Lee
(74) *Attorney, Agent, or Firm* — Kowert, Hood, Munyon, Rankin & Goetzel, P.C.

(57) ABSTRACT

Various embodiments to enable Spectrum Access System (SAS) interference mitigation options are disclosed herein. In one embodiment, an apparatus is provided. The apparatus includes a memory to store a data sequence, and one or more processing devices coupled to the memory. The processing devices to generate an interference metric associated with a first group and a second group of infrastructure nodes of a Long-Term Evolution (LTE) network infrastructure based on measurement information. The measurement information comprises measurements related to the transmission of data sequences associated with the first group and the second group. Thereupon, configuration settings are determined for infrastructure nodes of the first group and second group based on the generated interference metric. Each configuration setting represents a frequency band and transmission (Continued)

Figure 1:
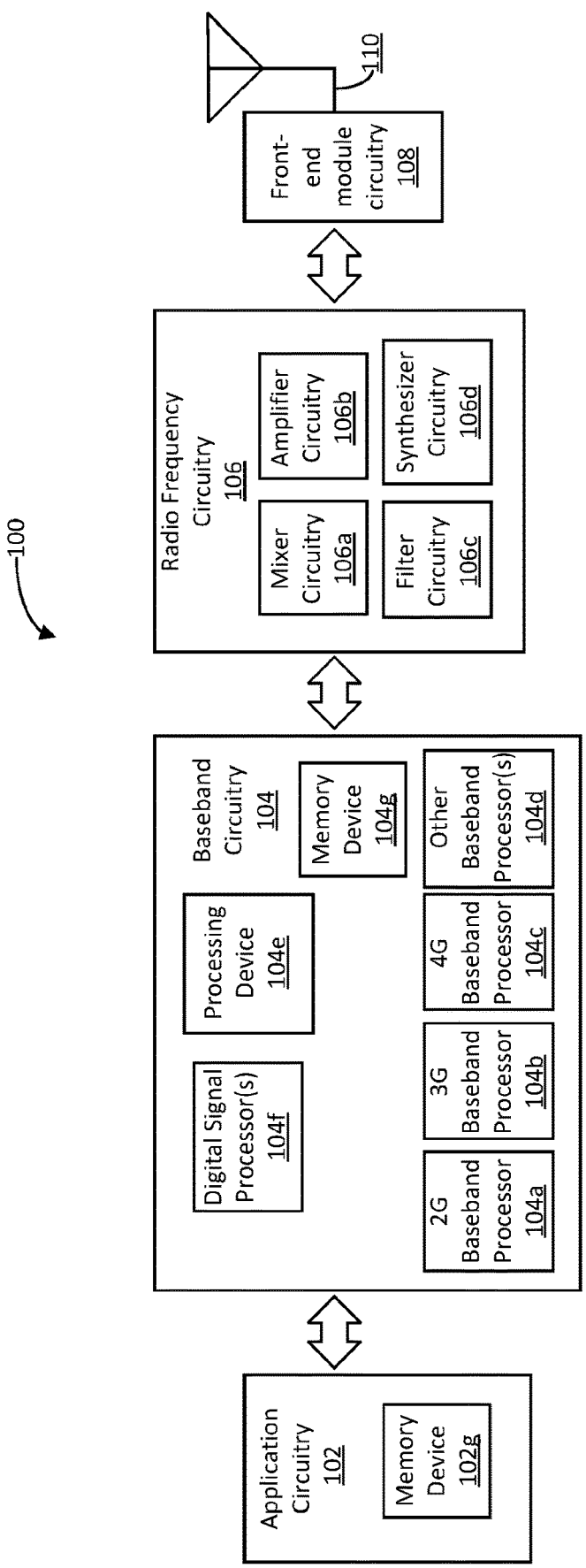

power level for a corresponding infrastructure node to access data in the LTE network infrastructure.

20 Claims, 8 Drawing Sheets

Related U.S. Application Data continuation of application No. 15/761,016, filed as application No. PCT/US2016/041722 on Jul. 11, 2016, now Pat. No. 10,548,142.

(60) Provisional application No. 62/242,872, filed on Oct. 16, 2015.

(51) Int. Cl.
    *H04W 24/02*    (2009.01)
    *H04W 16/14*    (2009.01)
    *H04W 52/24*    (2009.01)
    *H04B 17/345*   (2015.01)
    *H04W 88/08*    (2009.01)

(52) U.S. Cl.
CPC ......... *H04W 24/02* (2013.01); *H04W 52/143* (2013.01); *H04W 52/243* (2013.01); *H04W 88/08* (2013.01)

(56) References Cited

U.S. PATENT DOCUMENTS

| | | |
|---|---|---|
| 2010/0099424 A1 | 4/2010 | Centonza |
| 2011/0051631 A1 | 3/2011 | Niemela et al. |
| 2011/0280188 A1 | 11/2011 | Jeon et al. |
| 2012/0039192 A1 | 2/2012 | Peng et al. |
| 2012/0231829 A1 | 9/2012 | Guo |
| 2012/0269084 A1* | 10/2012 | Okubo ................. H04J 11/0036 370/252 |
| 2013/0178225 A1 | 7/2013 | Xing |
| 2013/0273928 A1 | 10/2013 | Westerberg et al. |
| 2013/0286940 A1 | 10/2013 | To et al. |
| 2014/0080535 A1 | 3/2014 | Gauvreau et al. |
| 2014/0348110 A1 | 11/2014 | Wang et al. |
| 2015/0133184 A1 | 5/2015 | Sadek et al. |
| 2015/0245374 A1 | 8/2015 | Mitola, III et al. |
| 2015/0326463 A1* | 11/2015 | Solondz .............. H04L 43/0829 370/252 |
| 2015/0358968 A1 | 12/2015 | Malladi et al. |
| 2016/0212624 A1 | 7/2016 | Mueck et al. |
| 2016/0219454 A1 | 7/2016 | Sawai |
| 2016/0227427 A1 | 8/2016 | Vajapeyam et al. |
| 2016/0270089 A1 | 9/2016 | Olfat et al. |
| 2016/0323834 A1 | 11/2016 | Rahman et al. |
| 2016/0381558 A1 | 12/2016 | Caulfield |
| 2017/0013471 A1 | 1/2017 | Wu et al. |
| 2017/0055268 A1 | 2/2017 | Aksu |
| 2017/0180938 A1 | 6/2017 | Smith |
| 2017/0265088 A1 | 9/2017 | Tsuda |
| 2018/0145741 A1 | 5/2018 | Zhao et al. |
| 2018/0206214 A1 | 7/2018 | Bendlin et al. |
| 2018/0279316 A1* | 9/2018 | Mueck ................ H04B 17/345 |
| 2018/0368006 A1 | 12/2018 | Furuichi et al. |
| 2019/0045397 A1 | 2/2019 | Mueck et al. |

FOREIGN PATENT DOCUMENTS

| | | |
|---|---|---|
| CN | 101138169 A | 3/2008 |
| CN | 102014426 A | 4/2011 |
| CN | 103281788 A | 9/2013 |
| WO | 1995012957 A1 | 5/1995 |
| WO | 2008142529 A2 | 11/2008 |
| WO | 2012074900 A3 | 6/2012 |
| WO | 2013184968 A1 | 12/2013 |

OTHER PUBLICATIONS

International Search Report and Written Opinion of the International Searching Authority for International Application No. PCT/US2016/041722 dated Oct. 18, 2016, 13 pgs.
Rejection Decision for Taiwanese Application No. 105126205, dated Jul. 23, 2020, with English translation, 7 pgs.
Office Action for Chinese Application No. 2016800542680 with Search Report translation, dated Oct. 27, 2020, 5 pgs.

* cited by examiner

SAS INTERFERENCE MITIGATION OPTIONS

CROSS REFERENCE TO RELATED APPLICATION

This application is a continuation of U.S. patent application Ser. No. 16/773,497 filed on Jan. 27, 2020, which is a continuation of U.S. patent application Ser. No. 15/761,016 filed on Mar. 16, 2018, which is a National Phase entry application of International Patent Application No. PCT/US2016/041722, filed on Jul. 11, 2016, which claims priority to U.S. Provisional Patent Application No. 62/242,872, filed Oct. 16, 2015. All of the aforementioned applications are incorporated herein by reference in their entireties.

The claims in the instant application are different than those of the parent application and/or other related applications. The Applicant therefore rescinds any disclaimer of claim scope made in the parent application and/or any predecessor application in relation to the instant application. Any such previous disclaimer and the cited references that it was made to avoid, may need to be revisited. Further, any disclaimer made in the instant application should not be read into or against the parent application and/or other related applications.

BACKGROUND

The disclosure relates to the field of wireless communications, including control and operation of network connections to mitigate interference between mobile network operators.

BRIEF DESCRIPTION OF THE DRAWINGS

Various embodiments of the disclosure will be understood more fully from the detailed description given below and from the accompanying drawings of various embodiments of the disclosure.

FIG. 1 is a block diagram illustrating example components of an electronic device implementing aspects of the disclosure, according to an embodiment.

FIG. 2 is a block diagram illustrating example components of a system for implementing interference mitigation options, according to an embodiment.

FIG. 3 is a block diagram illustrating example components and communication in a network infrastructure, according to an embodiment.

FIG. 4 is a block diagram illustrating another view of components and communication in the network infrastructure of FIG. 3, according to an embodiment.

FIG. 5 illustrates a flowchart of an example method of mitigating interference in a network infrastructure, according to an embodiment.

FIG. 6 illustrates a flowchart of an example method of mitigating interference between mobile network operators, according to an embodiment.

FIG. 7 illustrates a flowchart of an example method of mitigating interference between mobile network operators, according to an embodiment.

FIG. 8 illustrates a block diagram illustrating a machine in which an embodiment of the disclosure may be used.

DESCRIPTION OF EMBODIMENTS

Techniques to enable Spectrum Access System (SAS) interference mitigation options are disclosed herein. The SAS may govern and manage access to radio frequency bands of electromagnetic spectrum also referred to as spectrum. For instance, a service entity makes an application to the SAS by listing which Priority Access Licenses (PALs) it is interested in having priority access. The entity may request a specific PAL from the SAS that identifies both a frequency range as well as a geographic area (e.g., census tract, zip code, neighborhood name, etc.) to be accessed. For example, the specific PAL requested by the entity may identify 10 MHz of spectrum in a specific census tract. Generally, census tracts are geographic areas that have approximately 4000 residents and boundaries that follow visible features.

In some situations, similar spectrum sharing based systems (such as the European Licensed Shared Access) are defined for specific bands (3.55-3.7 GHz for SAS and 2.3-2.4 GHz for LSA) but they can be adapted for usage in any other suitable frequency hand in the future from 0-300 GHz and above and for any suitable bandwidth (10 MHz, 20 MHz, 100 MHz, any (integer) multiples of such bandwidths, etc.). In embodiments, SAS PAL bands (as well as LSA licensed bands) may rely on licensed systems (such as LTE, etc.) with additional provisions required by the (SAS) spectrum sharing system (e.g., access to the SAS entity, protection of incumbent, etc.) and SAS GAA bands (does not exist in European LSA context) may relay on unlicensed systems (such as WiFi, MuLTEfire, etc.) with additional provisions required by the (SAS) spectrum sharing system (e.g., access to the SAS entity, protection of incumbent, etc.); however, even GAA can possibly build on licensed systems, possibly operating jointly systems which are building on licensed systems and unlicensed systems with additional provisions required by the (SAS) spectrum sharing system (e.g., access to the SAS entity, protection of incumbent, etc.). Any of the radio links may operate according to any one or more of the following radio communication technologies and/or standards, including but not limited to: a Global System for Mobile Communications (GSM) radio communication technology, a General Packet Radio Service (GPRS) radio communication technology, an Enhanced Data Rates for GSM Evolution (EDGE) radio communication technology, and/or a Third Generation Partnership Project (3GPP) radio communication technology, for example Universal Mobile Telecommunications System (UMTS), Freedom of Multimedia Access (FOMA), 3GPP Long Term Evolution (LTE), 3GPP LTE-Advanced Pro, 3GPP Long Term Evolution Advanced (LTE Advanced), Code division multiple access 2000 (CDMA2000), Cellular Digital Packet Data (CDPD), Mobitex, Third Generation (3G), Circuit Switched Data (CSD), High-Speed Circuit-Switched Data (HSCSD), Universal Mobile Telecommunications System (Third Generation) (UMTS (3G)), Wideband Code Division Multiple Access (Universal Mobile Telecommunications System) (W-CDMA (UMTS)), High Speed Packet Access (HSPA), High-Speed Downlink Packet Access (HSDPA), High-Speed Uplink Packet Access (HSDPA), High Speed Packet Access Plus (HSPA+), Universal Mobile Telecommunications System-Time-Division Duplex (UMTS-TDD), Time Division-Code Division Multiple Access (TD-CDMA), Time Division-Synchronous Code Division Multiple Access (TD-CDMA), 3rd Generation Partnership Project Release 8 (Pre-4th Generation) (3GPP Rel. 8 (Pre-4G)), 3GPP Rel. 9 (3rd Generation Partnership Project Release 9), 3GPP Rel. 10 (3rd Generation Partnership Project Release 10), 3GPP Rel. 11 (3rd Generation Partnership Project Release 11), 3GPP Rel. 12 (3rd Generation Partnership Project Release 12), 3GPP Rel. 13 (3rd Generation Partnership Project Release 13), 3GPP Rel. 14 (3rd Generation Partnership Project Release 14), 3GPP Rel. 15 (3rd Generation Partnership Project Release 15), 3GPP Rel. 16 (3rd Generation Partnership Project Release 16), 3GPP LTE Extra, LTE Licensed-Assisted Access (LAA), UMTS Terrestrial Radio Access (UTRA), Evolved UMTS Terrestrial Radio Access (E-UTRA), Long Term Evolution Advanced (4th Generation) (LTE Advanced (4G)), cdmaOne (2G), Code division multiple access 2000 (Third generation) (CDMA2000 (3G)), Evolution-Data Optimized or Evolution-Data Only (EV-DO), Advanced Mobile Phone System (1st Generation) (AMPS (1G)), Total Access Communication System/Extended Total Access Communication System (TACS/ETACS), Digital AMPS (2nd Generation) (D-AMPS (2G)), Push-to-talk (PTT), Mobile Telephone System (MTS), Improved Mobile Telephone System (WITS), Advanced Mobile Telephone System (AMTS), OLT (Norwegian for Offentlig Landmobil Telefoni, Public Land Mobile Telephony), MTD (Swedish abbreviation for Mobiltelefonisystem D, or Mobile telephony system D), Public Automated Land Mobile (Autotel/PALM), ARP (Finnish for Autoradiopuhelin, "car radio phone"), NMT (Nordic Mobile Telephony), High capacity version of NTT (Nippon Telegraph and Telephone) (Hicap), Cellular Digital Packet Data (CDPD), Mobitex, DataTAC, Integrated Digital Enhanced Network (iDEN), Personal Digital Cellular (PDC), Circuit Switched Data (CSD), Personal Handy-phone System (PHS), Wideband Integrated Digital Enhanced Network (WiDEN), iBurst, Unlicensed Mobile Access (UMA), also referred to as 3GPP Generic Access Network, or GAN standard), Zigbee, Bluetooth®, Wireless Gigabit Alliance (WiGig) standard, mmWave standards in general (wireless systems operating at 10-300 GHz and above such as WiGig, IEEE 802.11ad, IEEE 802.11ay, etc.), future 5G (5th Generation Systems), etc.

In many situations, spectrum is shared by the entities in several discrete dimensions including: frequency and geography. For instance, the SAS may employ spectrum sharing in the same frequency band but in different geographical areas. These geographical areas could be defined as different markets or defined by geographic exclusion zones that prohibit specific activities in a specific geographic area. The spectrum is shared because communications spectrum is scarce, and the demand is growing everyday due to the multitude of new Internet access points and devices consuming vastly more bandwidth. In some situations, the same PAL may be allocated to two different entities independently of each other. For example, within two census tracts (e.g., census tracts "A" and "B"), an identical PAL slot (e.g., 10 MHz slot) may be allocated independently to different (e.g., competing) Mobile Network Operators (MNO), such as MNO "1" and "2". One issue of spectrum sharing is that MNO "1" in census tract "A" may be negatively impacted by interference from MNO "2" in neighboring census tract "B" and vice versa.

In some situations, a coordination mechanism may be used to share spectrum between disparate systems that operate within the same spectrum band. In one example, the coordination mechanism may rely on coexistence infrastructure that knows how a particular swath of spectrum is being used by a primary user in a known geographic area and uses this knowledge to manage spectrum access by all other users. In general, the coordination mechanism to spectrum sharing may be unable to achieve interference mitigation between neighboring census tract in certain situations. For example, in dense urban areas a size and shape of census tracts can be very irregular. This can make it difficult for current approaches to map the geographic area into regular shaped neighboring cells (e.g., hexagonal cells). Each cell represent a land area in which a network is distributed over and is served by at least one fixed-location transceiver, known as a cell site or base station.

In other situations, the coordination mechanism may be unable to achieve interference mitigation in an identical frequency band with non-cooperating equipment infrastructure situated between neighboring cells. For example, a shopping mall may acquire a single PAL license in a census tract covering its business while competing operators in surrounding neighboring cells acquire PAL licenses of the same frequency band as the mall. In such a case, the equipment infrastructure of the mall may be different from the equipment infrastructure used by the neighboring cells.

Embodiments of the disclosure provide techniques to enable various interference mitigation options between non-cooperative SAS network infrastructures. In some embodiments, the interference mitigation options provide suitable trade-offs between i) spectral efficiency, ii) required level of information sharing (which is a key concern to MNOs) and iii) complexity/feasibility as described herein. In one embodiment, the techniques of the disclosure provide interference mitigation through the creation of an interference metric that indicates a level of interference between two or a group of infrastructure components, such as Citizens Broadband Service Devices (CBSDs)/Base Stations (BS)/evolved Node Bs (eNB)s/access points (APs)/etc. The interference metric may be derived from the information provided by concerned infrastructure components to an aggregation node, such as the SAS entity node. Thereupon, the aggregation node may use the interference metric to mitigate interference in the network through optimized frequency allocation to a concerned infrastructure component or groups of infrastructure components, and/or activation coordination (e.g., through assignment of time slots, etc.), as well as by using other techniques to mitigation interference between components of the network.

FIG. 1 is a block diagram illustrating example components of an electronic device 100. In embodiments, the electronic device 100 may be, implement, be incorporated into, or otherwise be a part of a user equipment (UE), an evolved NodeB (eNB), an infrastructure node, an aggregation node, or one or more elements of a SAS. In some embodiments, the electronic device 100 may include application circuitry 102, baseband circuitry 104, Radio Frequency (RF) circuitry 106, front-end module (FEM) circuitry 108 and one or more antennas 110, coupled together at least as shown.

As used herein, the term "circuitry" may refer to, be part of, or include an Application Specific Integrated Circuit (ASIC), an electronic circuit, a processor (shared, dedicated, or group), and/or memory (shared, dedicated, or group) that execute one or more software or firmware programs, a combinational logic circuit, and/or other suitable hardware components that provide the described functionality. In some embodiments, the circuitry may be implemented in, or one or more software or firmware modules may implement functions associated with the circuitry. In some embodiments, circuitry may include logic, at least partially operable in hardware.

The application circuitry 102 may include one or more application processors. For example, the application circuitry 102 may include circuitry such as, but not limited to, one or more single-core or multi-core processors. The processor(s) may include any combination of general-purpose processors and dedicated processors (e.g., graphics processors, application processors, etc.). The processors may be coupled with and/or may include memory/storage and may be configured to execute instructions stored in the memory/storage to enable various applications and/or operating systems to run on the system.

The application circuitry 102 may further include memory/storage device 102g. The memory/storage device 102g may be used to load and store data (e.g., data sequences) and/or instructions for operations performed by the one or more application processors of the application circuitry 102. The memory/storage device 102g may include a non-transitory machine-accessible storage medium on which is stored software implementing any one or more of the methodologies of functions described herein. Memory/storage for one embodiment may include any combination of suitable volatile memory and/or non-volatile memory. The memory/storage device 102g may include any combination of various levels of memory/storage including, but not limited to, read-only memory (ROM) having embedded software instructions (e.g., firmware), random access memory (e.g., dynamic random access memory (DRAM), cache, buffers, etc. The memory/storage device 102g may be shared among the various processors or dedicated to particular processors.

The baseband circuitry 104 may include circuitry such as, but not limited to, one or more single-core or multi-core processors. The baseband circuitry 104 may include one or more baseband processors and/or control logic to process baseband signals received from a receive signal path of the RF circuitry 106 and to generate baseband signals for a transmit signal path of the RF circuitry 106. Baseband processing circuitry 104 may interface with the application circuitry 102 for generation and processing of the baseband signals and for controlling operations of the RF circuitry 106. For example, in some embodiments, the baseband circuitry 104 may include a second generation (2G) baseband processor 104a, third generation (3G) baseband processor 104b, fourth generation (4G) baseband processor 104c, and/or other baseband processor(s) 104d for other existing generations, generations in development or to be developed in the future (e.g., fifth generation (5G), 6G, etc.). The baseband circuitry 104 (e.g., one or more of baseband processors 104a-d) may handle various radio control functions that enable communication with one or more radio networks via the RF circuitry 106. The radio control functions may include, but are not limited to, signal modulation/demodulation, encoding/decoding, radio frequency shifting, etc. In some embodiments, modulation/demodulation circuitry of the baseband circuitry 104 may include Fast-Fourier Transform (FFT), preceding, and/or constellation mapping/demapping functionality. In some embodiments, encoding/decoding circuitry of the baseband circuitry 104 may include convolution, tail-biting convolution, turbo, Viterbi, and/or Low Density Parity Check (LDPC) encoder/decoder functionality. Embodiments of modulation/demodulation and encoder/decoder functionality are not limited to these examples and may include other suitable functionality in other embodiments.

In some embodiments, the baseband circuitry 104 may include elements of a protocol stack such as, for example, elements of an evolved universal terrestrial radio access network (EUTRAN) protocol including, for example, physical (PHY), media access control (MAC), radio link control (RLC), packet data convergence protocol (PDCP), and/or radio resource control (RRC) elements. A processing device 104e of the baseband circuitry 104 may be configured to run elements of the protocol stack for signaling of the PHY, MAC, RLC, PDCP and/or RRC layers. The processing device 104e may represent one or more general-purpose processing devices such as a microprocessor, processor, central processing unit, or the like. In some embodiments, the baseband circuitry may include one or more audio digital signal processor(s) (DSP) 104f. The audio DSP(s) 104f may be include elements for compression/decompression and echo cancellation and may include other suitable processing elements in other embodiments.

The baseband circuitry 104 may further include memory/storage device 104g. The memory/storage device 104g may be used to load and store data (e.g., data sequences) and/or instructions for operations performed by the processing device 104e of the baseband circuitry 104. The memory/storage device 104g may include a non-transitory machine-accessible storage medium on which is stored software implementing any one or more of the methodologies of functions described herein. Memory/storage for one embodiment may include any combination of suitable volatile memory and/or non-volatile memory. The memory/storage device 104g may include any combination of various levels of memory/storage including, but not limited to, read-only memory (ROM) having embedded software instructions (e.g., firmware), random access memory (e.g., dynamic random access memory (DRAM), cache, buffers, etc. The memory/storage device 104g may be shared among the various processors or dedicated to particular processors.

Components of the baseband circuitry may be suitably combined in a single chip, a single chipset, or disposed on a same circuit board in some embodiments. In some embodiments, some or all of the constituent components of the baseband circuitry 104 and the application circuitry 102 may be implemented together such as, for example, on a system on a chip (SOC).

In some embodiments, the baseband circuitry 104 may provide for communication compatible with one or more radio technologies. For example, in some embodiments, the baseband circuitry 104 may support communication with an evolved universal terrestrial radio access network (EUTRAN) and/or other wireless metropolitan area networks (WMAN), a wireless local area network (WLAN), a wireless personal area network (WPAN).

Embodiments in which the baseband circuitry 104 is configured to support radio communications of more than one wireless protocol may be referred to as multi-mode baseband circuitry.

RF circuitry 106 may enable communication with wireless networks using modulated electromagnetic radiation through a non-solid medium. In various embodiments, the RF circuitry 106 may include switches, filters, amplifiers, etc. to facilitate the communication with the wireless network. RF circuitry 106 may include a receive signal path which may include circuitry to down-convert RF signals received from the FEM circuitry 108 and provide baseband signals to the baseband circuitry 104. RF circuitry 106 may also include a transmit signal path which may include circuitry to up-convert baseband signals provided by the baseband circuitry 104 and provide RF output signals to the FEM circuitry 108 for transmission.

In some embodiments, the RF circuitry 106 may include a receive signal path and a transmit signal path. The receive signal path of the RF circuitry 106 may include mixer circuitry 106a, amplifier circuitry 106b and filter circuitry 106c. The transmit signal path of the RF circuitry 106 may include filter circuitry 106c and mixer circuitry 106a. RF circuitry 106 may also include synthesizer circuitry 106d for synthesizing a frequency for use by the mixer circuitry 106a of the receive signal path and the transmit signal path. In some embodiments, the mixer circuitry 106a of the receive signal path may be configured to down-convert RF signals received from the FEM circuitry 108 based on the synthesized frequency provided by synthesizer circuitry 106d. The amplifier circuitry 106b may be configured to amplify the down-converted signals and the filter circuitry 106c may be a low-pass filter (LPF) or band-pass filter (BPF) configured to remove unwanted signals from the down-converted signals to generate output baseband signals. Output baseband signals may be provided to the baseband circuitry 104 for further processing. In some embodiments, the output baseband signals may be zero-frequency baseband signals, although this is not a requirement. In some embodiments, mixer circuitry 106a of the receive signal path may comprise passive mixers, although the scope of the embodiments is not limited in this respect.

In some embodiments, the mixer circuitry 106a of the transmit signal path may be configured to up-convert input baseband signals based on the synthesized frequency provided by the synthesizer circuitry 106d to generate RF output signals for the FEM circuitry 108. The baseband signals may be provided by the baseband circuitry 104 and may be filtered by filter circuitry 106c. The filter circuitry 106c may include a low-pass filter (LPF), although the scope of the embodiments is not limited in this respect.

In some embodiments, the mixer circuitry 106a of the receive signal path and the mixer circuitry 106a of the transmit signal path may include two or more mixers and may be arranged for quadrature downconversion and/or upconversion respectively. In some embodiments, the mixer circuitry 106a of the receive signal path and the mixer circuitry 106a of the transmit signal path may include two or more mixers and may be arranged for image rejection (e.g., Hartley image rejection). In some embodiments, the mixer circuitry 106a of the receive signal path and the mixer circuitry 106a may be arranged for direct downconversion and/or direct upconversion, respectively. In some embodiments, the mixer circuitry 106a of the receive signal path and the mixer circuitry 106a of the transmit signal path may be configured for super-heterodyne operation.

In some embodiments, the output baseband signals and the input baseband signals may be analog baseband signals, although the scope of the embodiments is not limited in this respect. In some alternate embodiments, the output baseband signals and the input baseband signals may be digital baseband signals. In these alternate embodiments, the RF circuitry 106 may include analog-to-digital converter (ADC) and digital-to-analog converter (DAC) circuitry and the baseband circuitry 104 may include a digital baseband interface to communicate with the RF circuitry 106.

In some dual-mode embodiments, a separate radio IC circuitry may be provided for processing signals for each spectrum, although the scope of the embodiments is not limited in this respect.

In some embodiments, the synthesizer circuitry 106d may be a fractional-N synthesizer or a fractional N/N+1 synthesizer, although the scope of the embodiments is not limited in this respect as other types of frequency synthesizers may be suitable. For example, synthesizer circuitry 106d may be a delta-sigma synthesizer, a frequency multiplier, or a synthesizer comprising a phase-locked loop with a frequency divider.

The synthesizer circuitry 106d may be configured to synthesize an output frequency for use by the mixer circuitry 106a of the RF circuitry 106 based on a frequency input and a divider control input. In some embodiments, the synthesizer circuitry 106d may be a fractional N/N+1 synthesizer.

In some embodiments, the voltage-controlled oscillator (VCO) provides frequency input, although that is not a requirement. Either the baseband circuitry 104 or the applications processor 102 depending on the desired output frequency may provide divider control input. In some embodiments, a divider control input (e.g., N) may be determined from a look-up table based on a channel indicated by the applications processor 102.

Synthesizer circuitry 106d of the RF circuitry 106 may include a divider, a delay-locked loop (DLL), a multiplexer and a phase accumulator. In some embodiments, the divider may be a dual modulus divider (DMD) and the phase accumulator may be a digital phase accumulator (DPA). In some embodiments, the DMD can divide the input signal by either N or N+1 (e.g., based on a carry out) to provide a fractional division ratio. In some example embodiments, the DLL may include a set of cascaded, tunable, delay elements, a phase detector, a charge pump and a D-type flip-flop. In these embodiments, the delay elements may be configured to break a VCO period up into Nd equal packets of phase, where Nd is the number of delay elements in the delay line. In this way, the DLL provides negative feedback to help ensure that the total delay through the delay line is one VCO cycle.

In some embodiments, synthesizer circuitry 106d may be configured to generate a carrier frequency as the output frequency, while in other embodiments, the output frequency may be a multiple of the carrier frequency (e.g., twice the carrier frequency, four times the carrier frequency) and used in conjunction with quadrature generator and divider circuitry to generate multiple signals at the carrier frequency with multiple different phases with respect to each other. In some embodiments, the output frequency may be a LO frequency (fLO). In some embodiments, the RF circuitry 106 may include an IQ/polar converter.

FEM circuitry 108 may include a receive signal path which may include circuitry configured to operate on RF signals received from one or more antennas 110, amplify the received signals and provide the amplified versions of the received signals to the RF circuitry 106 for further processing. FEM circuitry 108 may also include a transmit signal path which may include circuitry configured to amplify signals for transmission provided by the RF circuitry 106 for transmission by one or more of the one or more antennas 110.

In some embodiments, the FEM circuitry 108 may include a TX/RX switch to switch between transmit mode and receive mode operation. The FEM circuitry may include a receive signal path and a transmit signal path. The receive signal path of the FEM circuitry may include a low-noise amplifier (LNA) to amplify received RF signals and provide the amplified received RF signals as an output (e.g., to the RF circuitry 106). The transmit signal path of the FEM circuitry 108 may include a power amplifier (PA) to amplify input RF signals (e.g., provided by RF circuitry 106), and one or more filters to generate RF signals for subsequent transmission (e.g., by one or more of the one or more antennas 110.

In some embodiments, the electronic device 100 may include additional elements such as, for example, memory/storage, display, camera, sensor, and/or input/output (I/O) interface.

In some embodiments, the RF circuitry 106 may be to receive and/or transmit signals. The baseband circuitry 104 may be to issue requests for signal power and interference information measured between infrastructure nodes. The baseband circuitry 104 may also be to produce metrics measure inter-node interference.

In some embodiments, the RF circuitry 106 may be to receive and transmit signals. The baseband circuitry 104 may be to measure signal power and interference information between the apparatus and one or more infrastructure nodes. The baseband circuitry 104 may also be to provide the determined information to an aggregator node for determination of one or more inter-node interference metrics.

In some embodiments, the RF circuitry 106 may be to receive and transmit signals and to receive a trigger signal, such as an Uplink signal, from an aggregator node that inter-node interference metrics are being determined. The baseband circuitry 104 may be used to facilitate a determination of signal power and interference information by infrastructure nodes of a Long-Term Evolution (LTE) infrastructure.

Figure 2:
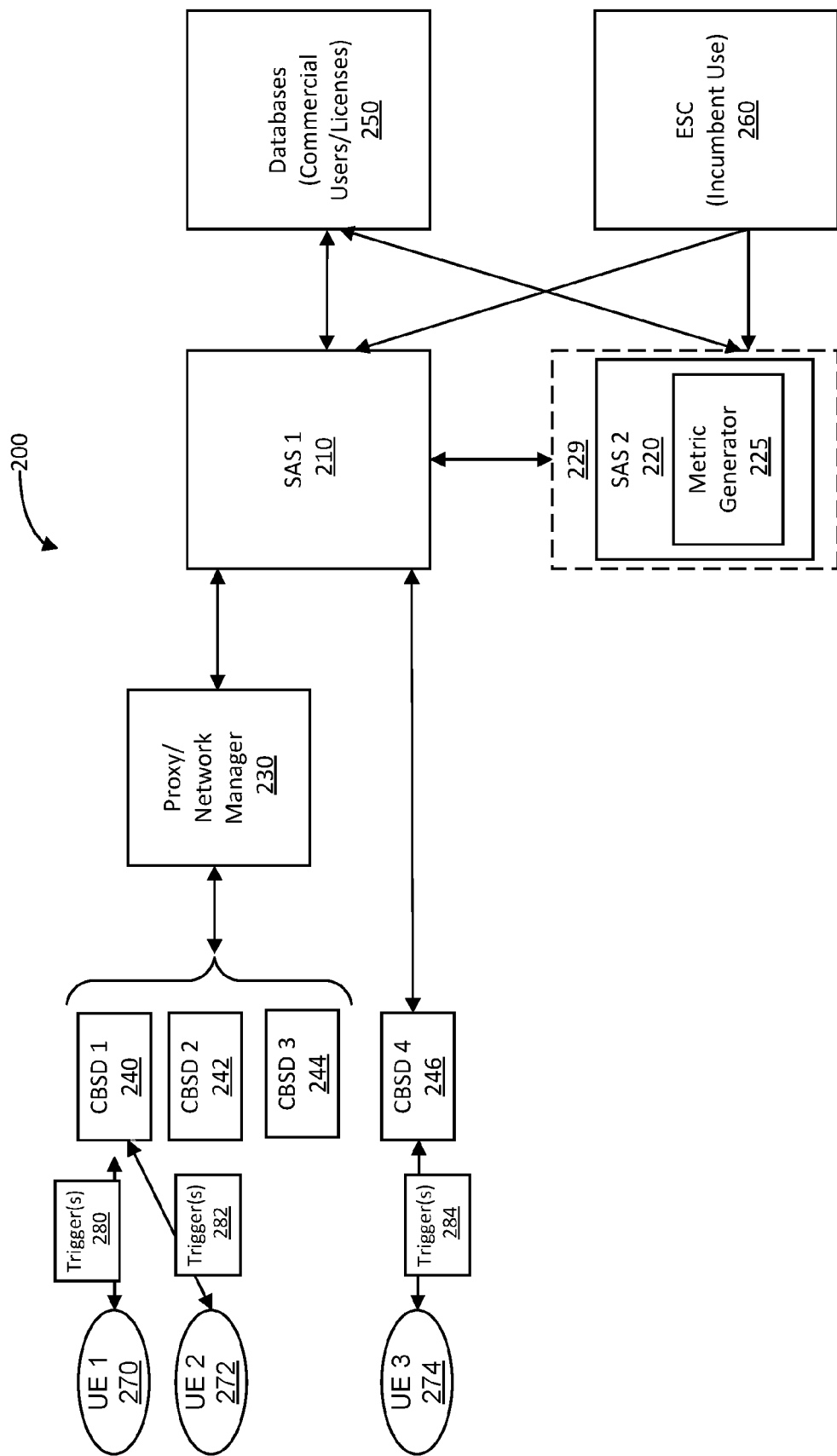

Embodiments described herein may be implemented into a system using any suitably configured hardware and/or software. FIG. 2 illustrates, for one embodiment, example components of a system 200 for implementing interference mitigation methods as described herein. In some embodiment, the system may represent an example of a LTE infrastructure comprising a plurality of infrastructure nodes. For example, the system 200 includes a plurality of SASs (e.g., SAS 1 210 and SAS 2 220) that may be used to coordinate spectrum use between incumbent federal users, PAL (Priority Access License) Users and GAA (General Authorized Access) Users.

In some embodiments, the SASs (210, 220) may coordinate spectrum sharing within the system 200 in the 3.5 GHz band by use of a three-tiered sharing system. In some embodiments, an order of priority in the three-tiered sharing system may include (1) incumbent licensees; (2) PA licensees; and (3) GAA operators. The first and highest tier ("Tier 1") includes incumbent federal users and fixed satellite service ("FSS") operators. The second tier ("Tier 2") includes PAL users that may be authorized to use an unpaired 10 MHz channel of a certain range in a geographic service area (e.g., census tract) for a determined time period. The third tier ("Tier 3") incudes GAA operators that are permitted access to 80 MHz of a 3.5 GHz band that is not assigned to a higher tier. Equipment used in the GAA band may be used without obtaining an individual spectrum license. The SASs is central to coordinating spectrum in the 3.5 GHz band, and tier 2 or tier 3 devices may not operate unless they are in communication with the SASs (210, 220) and receive information as to when and where to use 3.5 GHz channels.

In cases when there is a plurality of SASs, such as in system 200, they may be synchronized with each other. The SAS operates as a central coordinator for spectrum within the system 200 and includes substantial information about the network and devices that are used therein. In some embodiments, the SAS (e.g., 210, 220) is used to facilitate spectrum sharing within system 100. In one salutation, the system 200 may dedicate frequency bands for sharing spectrum. For example, the system 200 may employ a proxy/network manager 230 that can accept a set of one or more available channels in the 3.5 GHz and select channels for use by specific CBSDs 240-246. In turn, the SAS, such as SAS_1 210 and SAS_2 220, may communicate allowed frequencies of operation, permitted transmission power levels and duration at a designated location upon request from a registered and authenticated CBSD. CBSDs 240-246 would not be permitted to operate without registration of location and connection to an authorized FCC database 250. In order to operate within bands designated for sharing spectrum, registered CBSDs 240-246 must have the capability to geolocate in three dimensions (3D) in near real time with high accuracy for the SAS to be able to provide them with an accurate set of allowed channels in a timely manner (i.e., on the order of seconds). In other situations, the system 200 may implement a Environmental Sensing Capability ("ESC") system 260 that detects and communicates with the presence of a signal from an incumbent federal user to an SAS to facilitate shared spectrum access and use in and adjacent to the 3.5 GHz band.

In some situations, interference may occur between infrastructure components of system 200 because of the sharing spectrum in the system. This type of interference can occur when two or more systems operate in the same geographic area and are transmitting on the same frequency. To mitigate interference, the system 200 may include a metrics generator 225 to generate specific interference metrics. The interference metrics may be based on information provided by the concerned infrastructure components (e.g., CBSDs/BS/eNB/AP/etc.) to an aggregation node, such as the SAS entity node 220. The information to be provided includes some or all of the following elements: geographic area description (including 3D indications such as heights, obstacles, etc.), information on propagation characteristics, e.g., Line-of-Sight (LOS), Non-Line-of-Sight (NLOS), signal multipath such as when an RF signal arrives at the receiving antenna from more than one propagation route, etc., and output transmission power levels (such as the maximum level or indications on the specific allocation for a given time slot, etc.).

The UEs 270-274 may be controlled by an authorized CBSD and have the capability to receive and decode information from the CBSD. In various embodiments, the metrics generator 225, in order to achieve interference mitigation in the shared spectrum context, may work in concert with User Equipment (e.g., cellular mobile devices, modems, etc.) of system 200, such as UE_1 270 through UE_3 274. For example, the determination of the interference metrics by the metrics generator 225 may include transmissions of (learning/training) sequences to UEs 270-274 (e.g., mobile devices) within a specific cell or land area served by a cell site (e.g., the cell which is serving as interfering cell to other cells). For example, the learning sequences include data symbols that are transmitted in accordance with a known training sequence (e.g., a particular order of data symbols). The (learning/training) sequences are used to probe line communications in the system 200 to determine interference levels. For example, a measure of interference levels between two UEs in the system 200 may be determined based on an amount of data loss or corruption detected in the data sequence from the transmitted learning sequences.

To activate the transmission of the (learning/training) sequences between the UEs, a master component (e.g., a SAS component or any (pre-determined) master cell) may transmit the trigger signal (e.g., triggers 280-284) to the concerned infrastructure equipment (e.g., CBSDs 240-246). The concerned infrastructure component(s) may provide that trigger signal to the attached (selected) mobile devices (e.g., UEs 270-274). Those devices may receive the triggers (e.g., triggers 280-284) and initiate transmissions of (training/learning) sequences, which can be exploited by neighboring cells in order to identify aggregate interference levels. For example, signals originating from mobile devices lead to uplink interference while any interference originating from infrastructure equipment leads to downlink interference. The mobile devices may stop their respective transmissions of (training/learning) sequences upon reception of a second trigger signal provided by the infrastructure components to which they are attached or after expiration of a determined time interval or by any other technique.

In some situations, the UEs 270-274 may not have an active role in the determination of interference levels between infrastructure components of system 200. For example, some UEs, such as mobile devices, may stay silent (e.g., not-transmitting) during a period when the interference metrics are determined and the (learning) signals are transmitted over the air. In some situations, the UEs may be instructed to stay silent in those frequency band(s) in which the (training) sequences for interference metric determination are being transmitted. In such cases, the mobile devices (e.g., UEs 270-274) receive a first trigger signal (e.g., triggers 280-284) from the respective infrastructure components to which they are attached (e.g., CBSDs 240-246). This trigger may indicate a time period during which no transmission should be initiated in the UE.

Normal operation or transmissions capabilities of the UEs 270-274 may be restored when a second trigger signal is provided by the SAS component or when a certain predetermined (e.g., originally provided by the SAS in the original trigger signal) time duration has elapsed and thus the period for determining the interference parameters has expired. In some embodiments, the UE may wait for the second trigger signal before restoring normal transmission capabilities (indicating that the determination of interference metrics is finalized).

In other embodiments, the UEs 270-274 may be used as measurement nodes or emulation nodes (e.g., for emulating network traffic) to replace transmissions by actual neighboring infrastructure components. For example, when some infrastructure components are not under control of a given master (such as a SAS component, master infrastructure component, etc.), then the interference metric may not be provided by the concerned infrastructure component. In this case, it is possible to identify UEs that are located in geographic proximity to the target infrastructure components. In such cases, the UEs may receive the training sequence (e.g., a sequence) and report measured signal levels to the concerned master device. Furthermore, in case a given infrastructure component is not able to communicate with the master component, it may not be possible to force the corresponding infrastructure component to transmit a training/learning sequence. In this case, one or more UEs may be identified which are located in geographic proximity to the target infrastructure components. These UEs may be triggered via triggers 280-284, respectively, to transmit a training sequence instead of the target infrastructure components. In some situations, the training sequence must be transmitted as an Uplink (UL) signal, since this may be the only capability of the target UE.

The infrastructure components of system 200 provide the determined interference metric values to a target or aggregator node. For example, this target/aggregator node can be a SAS component, such as SAS_2 220, a master infrastructure component 229 (such as a (pre-defined) BS, eNB, AP, etc.). In some embodiments, the SAS component, such as SAS_2 220 may be comprised in a master infrastructure component 229, such as an eNB. In embodiments, the target node may use the interference metrics together with any other available information (such as geographic location of target infrastructure components, preferred/available/possible output transmission power levels (intervals), available frequency bands, available bandwidths, etc.) in order to derive an optimum parameterization of the entire LTE network. For example, the optimum parameterization may comprise the usage of suitable target (shared) frequency bands and related maximum output transmission power levels. In some situations, the hands and the output power levels are chosen over the entire network such that the level of interference on each of the components (the interference onto incumbents as well as onto SAS components themselves) is as low as possible. This is, for example, accomplished by central allocation of frequencies & maximum output power levels upon request by the concerned nodes. It should be noted that the wireless innovation forum (WInnF) currently includes an option to allow for the various nodes requesting a specific band allocation. In turn, the SAS controller can either grant or not grant the allocation request (without performing an overall optimization of the best possible band allocation over the entire network). For this purpose, the target node may use the interference metrics to determine network bandwidth configuration settings (e.g., network bandwidth, channel allocation, maximum output power levels, etc.) in a particular frequency band to be used by each infrastructure component to access (e.g., transmit/receive) data in the LTE network upon request for access by a network node such as a SAS LTE BS. In some embodiments, any parameterization of a Base Station (or any other network node) may not only relate to an omnidirectional transmission (typical for UE Devices) but also to sector transmissions (typical for Base Stations). For sector transmissions, the frequency and/or maximum power level allocation may be optimized (independently) for each sector of each Base Station/network node.

In addition, the target/aggregate node (e.g., SAS 225) may identify other suitable reconfiguration parameters such as maximum output power levels (and possibly recommended minimum power levels in order to avoid too high interference levels from neighboring nodes), MIMO configurations (e.g., directing the output beams away from certain infrastructure nodes or even user devices which should be protected), preferred (channel) coding and/or related Modulation-and-Coding-Schemes (MCS) which lead to a sufficient interference robustness level, etc. For example, a system may need to perform at a certain level in the context of the observed noise/interference levels, which requires that the MCS is chosen such that a target Packet-Error-Rate (PER or Bit-Error-Rate (BER) or any other related metric) is achieved. In this regard, the MCS may be chosen such that at least a $PER<10^{-2}$ is reached, which typically corresponds to a BER requirement of approximately $BER<10^{-4}$.

In some embodiments, the reconfiguration of the parameters is performed in order to achieve an overall minimum level of interference, such as the minimization of the interference level onto the infrastructure component, which is experiencing the most interference among all infrastructure components of system 200. For example, an optimization over all (Base Station) network nodes is performed providing a SAS band allocation to all Base Station requesting access to SAS spectrum. In some situations, the bands are allocated by the SAS such that for any Base Station the observed noise/interference levels are as low as possible.

Figure 3:
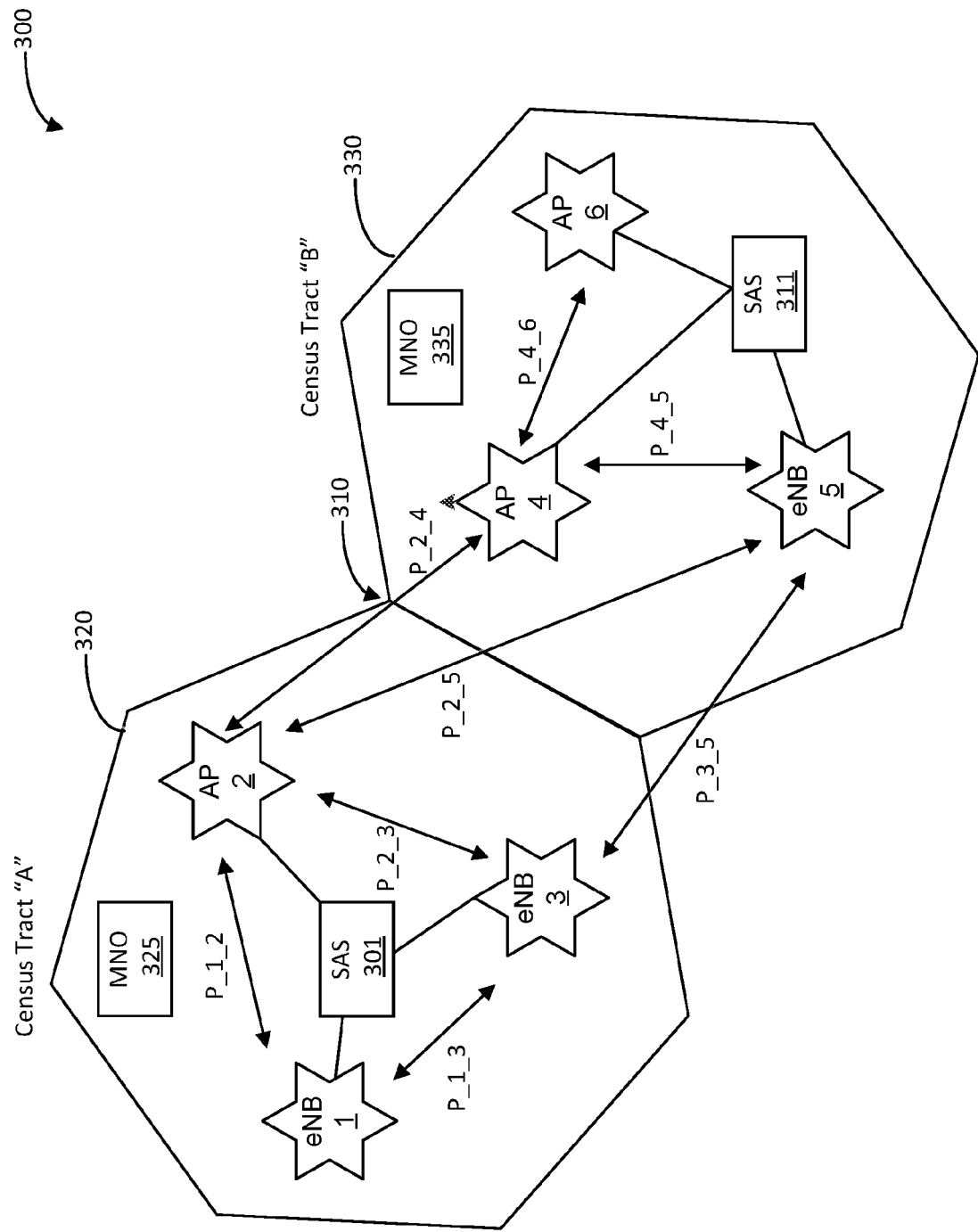

FIG. 3 is a block diagram illustrating components and communication in a network infrastructure 300, according to an embodiment. In this example, the network infrastructure 300 may represent an example of a LTE infrastructure comprising a plurality of infrastructure nodes (e.g., CBSDs, BSs, eNBs, APs/etc.). For example, network 300 includes eNBs 1, 3 and 5, and APs 2, 4 and 6. In some embodiments, the network 300 includes SASs, such as SASs 301 and 311, which are in communication with the infrastructure nodes to coordinate spectrum use by the infrastructure nodes.

As shown in FIG. 3, the network infrastructure 300 may be associated with two census tracts 320 and 330 (e.g., census tracts "A" and "B"). The census tracts 320 and 330 may cover neighboring geographic areas that including at least one corresponding boarder, such as boarder 310. In some situations, spectrum may be allocated to two different (e.g., non-cooperating) entities associated with each census tract independently of each other. For example, entity MNO 325 may be allocated spectrum to provide to the infrastructure nodes (e.g. eNBs 1, 3 and AP 2) of census tract A 320 and entity MNO 335 may be allocated spectrum to provide to the infrastructure nodes (e.g. APs 4, 6 and eNB 5) of census tract B 330. One issue of sharing spectrum is that MNO 325 in census tract A 320 can be negatively impacted by interference from MNO 335 in neighboring census tract B 330 and vice versa.

Techniques of the disclosure provide interference mitigation through the creation of an interference metric "P_x_y" associated with infrastructure nodes x and y of network 300. For example, the interference metric "P_x_y" may be derived between "x" and "y" infrastructure nodes, such as CBSDs/BSs/eNBs/APs/etc. The interference metric "P_x_y" indicates a level of interference between the two. Each infrastructure component initiates, for example, by sending a trigger signal, the determination of an interference metric between nodes x and y. A single metric can address both interference directions (x→y and y→x) or independent metrics may be defined for both directions. The metric can indicate interference in either directions (x→y and y→x) or independent metrics may be defined for each direction. In some embodiments, an independent metric may be required if the parameterization of the concerned infrastructure components is different from each other. For example, "independent metrics" may mean that for both directions separate and independent metrics are introduced, e.g., one metric for x→y and one for y→x. This may be required if the Quality of Service (QoS) or Quality of Experience (QoE) is more important in one direction compared to the other communication direction. An example is a video streaming service, the request for a video can be easily resent and thus the uplink probably doesn't need to be very robust; the video stream itself, however, should be communicated in a highly robust way such that the video is not interrupted. In such a case, two different metrics are preferable.

The interference metric "P_x_y" can be determined in several ways. In one example, the interference metric can be computed based on a sum of signals received from the infrastructure nodes (other than the desired transmission node Tx) using long term fading propagation models. In some embodiments, the long term fading propagation model may be determined based on the following:

$$I_p = \sum \frac{P_t G_t G_r \lambda^2}{(4\pi)^2 d^n L}$$

Where Ip is the interference metric with respect to a transmitter node (e.g., Tx) and a receiver node (e.g., Rx), Pt is the Tx power, Gt is the Tx antenna gain, Gr is the Rx antenna gain, λ is the wavelength, d is the distance between the Tx and Rx and n is the path loss coefficient. L is a system loss factor. If certain metric (like antenna gain etc.) is not known for a few devices, then a worst-case number or average numbers can be used. In alternative embodiments, other models can also be used.

In alternative embodiments, the interference metric may be determined based on measurements associated with the infrastructure nodes. In this case, the aggregation node, such as an SAS entity, may trigger (e.g., by transmitting a trigger signal) the transmission of signals from neighboring nodes (e.g., CBSDs/BS/eNB/AP/etc.) that are then measured by the target node. For example, for measuring the interference level from CBSDs/BS/eNB/AP/etc. "1" onto "2" and "3", a transmission is first initiated by "1" and the received power levels are measured by "2" and "3". Then, the transmission is triggered by "2" and the received power levels are measured by "1" and "3" and so forth for all CBSDs/BS/eNB/AP/etc. These values (e.g., reception power levels) are then reported to the aggregation entity assuming that the transmission always occurred in the same frequency band.

The interference metric can be either Radio Access Technology (RAT) agnostic or take into account specific RAT characteristics (e.g., time division duplex (TDD) or frequency division duplex (FDD) a contention-based protocol, etc.). In some embodiments, the specific RAT characteristics, as well as current configuration parameters of the nodes (e.g., output power levels, multiple-in, multiple-out (MIMO) configuration, antenna directivity, etc.), are not taken into account for simplicity. Thus, the interference relationship with respect to "x" and "y" infrastructure nodes may be identical in both directions, and based on the distance between them, as well as the terrain for LOS propagation.

In another example, the specific RAT characteristics, as well as the current configuration parameters of the nodes (e.g., output power levels, MIMO configuration, antenna directivity, etc.), are taken into account. Thus, the interference relationship with respect to "x" and "y" infrastructure nodes may be different for both directions, e.g., there may be one "P_x→y" and one "P_y→x" and both values may depend on the specific configuration parameters of the concerned infrastructure nodes.

To manage the process of identifying the interference metric "P_y→x", several techniques may be used. In some embodiments, the SAS components of network 300 may manage the process of identifying the interference metrics. For example, SAS components, such a SAS 301 or SAS 311, may start the process of identifying the interference metrics by sending a trigger to other concerned infrastructure components (which are registered to the SAS). In some embodiments, the SAS component may include further information on the various infrastructure components such as geographic location, parameterization (such as output power levels, bandwidths, supported frequency bands, RAT type, etc.) indicating that a dedicated time phase is reserved for the determination of interference metrics.

The trigger may be provided by the SAS components or following decisions within concerned MNOs (e.g., MNOs 325, 335) or any other network or by decision in any network component such as BS, eNBs, APs, Small Cells, EPC, etc.). Each infrastructure component in response to receiving the trigger may identify neighbors that are relevant for determining the interference metrics based on the location information of the neighboring infrastructure components. For example, the neighboring infrastructure components that are considered to be relevant for interference cases are those located in a geographic proximity to the concerned infrastructure component. This approach may be straightforward in case of a single-MNO network where one stakeholder is controlling all infrastructure components.

The concerned infrastructure node may sense the presence of neighboring infrastructure components, for example through detection of the cell ID, WiFi ID or similar. For example, the presence of neighboring infrastructure components may be determined through sensing of the signal strength (e.g., received power levels) of the identified neighboring infrastructure component. In some embodiments, multiple infrastructure components may collaborate in order to jointly identify the signal strength (and thus interference level) created by a neighboring infrastructure component. For example, this collaboration may be accomplished through exchange of measurement results, through distributed MIMO based measurements creating a MIMO receiver based on the antennas at the locations of collaborating infrastructure equipment, etc.

In alternative embodiments, the process of identifying the interference metrics is managed by a selected infrastructure component instead of the SAS component. In this case, the process is the same as indicated above—with the difference that the control is managed by a (pre-defined or (locally) selected/negotiated) infrastructure component. In some cases, the interference metrics may be identified during the usual operation of infrastructure components. In such cases, there is no specific time period that is dedicated to the identification of the interference metrics. The power levels of various interfering infrastructure components may be identified through the identification of an identification signal and a subsequent derivation of the received power levels of this signal at the location of the interfered infrastructure component. In case that a received power level by an interfered cell is below a threshold (e.g., the sensitivity threshold), no interference metric is derived or the interference metric is set to "0" (no interference).

During the time that the interference metrics are derived, the transmission and reception frequencies of the concerned infrastructure components are utilized by the overall management node (e.g., the SAS component or a master infrastructure component) and be communicated to the receiving infrastructure components. For example, a (unused) carrier frequency may be used (possibly with limited bandwidth) for transmission of concerned (learning) sequences for determination of interference metrics. In some embodiments, the interference metrics may be determined while the standard operation of the infrastructure nodes is not (or only partly) interrupted/disturbed. Because of this, a (learning) sequence can, for example, be transmitted in industrial, scientific, and medical radio (ISM) reserved bands (preferably in neighboring frequency bands closely located to the concerned working frequency of the concerned infrastructure components) or in any other band (preferably of reduced/low economic value). In some embodiments, when the interference metrics are derived, all (or a sub-set of) infrastructure components may be silenced (e.g., not transmitting). Except for those which (are triggered to) send (pre-defined learning) sequences that are used by the other infrastructure components to derive the interference metric.

In some embodiments, the interference metrics may change over time, e.g. when the location of infrastructure components is moved (which is possible for WiFi APs, etc.) or when the traffic characteristics change (for example, an unloaded cell may lead to low levels of interference onto other neighboring cells). If this is the case, the entire process for determining the interference levels between neighboring infrastructure components may be re-initiated. Alternatively, the master node (such as the SAS component or an identified master infrastructure component) may identify those interference nodes for which the interference metrics no longer apply. This may be reported by the concerned infrastructure components in case that the interference behavior (i.e., SINR levels, Packet-Error-Rate levels, Bit-Error-Rate levels, level of retransmissions, etc.) is not corresponding to the expected level (e.g., such a reporting is initiated if the observed interference level is much better or much worse compared to the expected level). Thereupon, the process for determining the interference metrics may be applied to those infrastructure components for which the issues have been identified. Possibly, neighboring infrastructure components are also included, since a similar issue may apply to them even though they did not report any abnormal behavior.

An aggregation entity (such as a SAS component) may perform a global optimization using the interference metrics such that all available PAL (and possibly GAA) frequency slots are allocated in such a way that the global interference levels are minimized. For example, two distinct frequency blocks may not cause any measurable interference with each other, but the out of band emission levels can lead to a slight interference between neighboring frequency blocks. In one such case, if neighboring Base Stations use neighboring channels, e.g., one base station uses band 3.500 GHz-3.510 GHz and a neighboring Base Station uses 3.510-3.520 GHz, the channels are different and they do not interfere in the sense of overlapping transmissions in the same bands. However, emissions may have out of band and spurious emissions. For example, the transmission of 3.500 GHz-3.510 GHz is not strictly limited to this band may "leak" into the neighboring band 3.510-3.520 GHz, and, thus, impact the corresponding performance.

In such a case, the optimization can be done such that a maximum interference metric value determined amongst the concerned infrastructure nodes may be minimized for the final allocation of frequency slots across all CBSDs/BS/eNB/AP/etc. Once the frequencies are allocated, if any of the CBSDs report high levels of interference, mitigation schemes may be adopted that switch the frequencies and redo the map so interference metrics are maintained. For example, the SAS spectrum band allocation may be changed among the requesting Base Stations such that the frequency map indicating, for example, which Base Station has which SAS channel allocation, is modified in order to improve the interference levels observed by some/all Base Stations. In some embodiments, the SAS may also adjust the power levels of the CBSDs without changing the frequencies to maintain interference thresholds. While PALs are guaranteed interference protection from GAAs, GAAs are not guaranteed any interference protection. However, if the SAS assigned a specific GAA channel to a CBSD (instead of providing it with a choice of GAA channels), the GAA CBSD may send the SAS a message about increased interference such that it may receive a better channel.

In some embodiments, the SAS may initially adjust the power levels without redoing the frequency map. For example, in case that a system observes a lot of interference in one SAS hand (e.g., 3.500-3.510 GHz), then the system looks for all neighboring Base Stations which use the same frequency band. Most likely interferers are identified among those neighboring systems and corresponding maximum output power levels are reduced. If the power reduction communication is infeasible, then the SAS may switch the frequencies and redo the map. For example, the SAS spectrum band allocation may be changed among the requesting Base Stations such that the frequency map indicating, for example, which Base Station has which SAS channel allocation, is modified in order to improve the interference levels observed by some/all Base Stations. If the PAL CBSD indicates high levels of interference, then the SAS may initially send a request to the GAA CBSDs to reduce their power levels based on their distance from the PAL CBSD. Their power levels may be inversely proportional to wavelength (e.g., d″) and directly proportional to the antenna gain on the Tx. If the reduction of power renders the GAA communication infeasible, the SAS can then assign the GAA a different channel. If the GAA CBSD complains of excessive interference, the SAS may initially reduce the power levels of other GAA CBSDs in the area. If that is not feasible, then the SAS may switch the GAA channel. In all the channels, the CBSDs may also keep an account of the measured interference metric Ip, and can request the channel with the lowest interference metric Ip.

Each of the CBSDs or even UEs that are capable of sensing the ambient noise floor and signal levels may do so to a centralized location (SAS or another aggregation point within the network 300). While the exact interference from one device to another may not be given, the centralized location may not need synchronization to take the measurements. Each device may measure the average (Ia) and peak (Ip) interference levels when it is not transmitting. The average interference power may be assumed if only part of the CBSDs is transmitting. While the peak power can be assumed, when all the CBSDs (surrounding the sensing node) are transmitting. The SAS or the entity that performs interference management may then try to minimize Ip and/or Ia. For example, for any specific interfered device operating in a specific frequency hand (e.g., 3.500-3.510 GHz), the SAS Controller identifies neighboring BS s operating in the same band. Then, the SAS may modify spectrum allocations and/or maximum output power levels for the BS s such that the interference level at the observed interfered nodes (and possibly (all) other nodes) is minimized. In some embodiments, any parameterization of a Base Station (or any other network node) may not only relate to an omnidirectional transmission (typical for UE Devices) but also to sector transmissions (typical for Base Stations). For sector transmissions, the frequency and/or maximum power level allocation may be optimized (independently) for each sector of each Base Station/network node.

If the SAS is aware of the exact transmitting powers of all the CBSDs, then the SAS may reduce the power levels of the ones with the highest Tx powers that are close to the impacted area. If the SAS is unaware of the exact power levels that the CBSDs are using, then, the SAS may move x CBSDs to a different channel where x is a percentage of existing CBSDs that is proportional to the percentage of power level reduction needed, and cut the power levels of CBSDs proportional to the percentage of reduction in interference power levels and inversely proportional to the distance squared (or to the power of the path loss coefficient) from the impacted area. In addition, the infrastructure nodes may also track the duration that interference is above a given threshold (say Ith) and the reduction in power levels can be done proportional to Time (Ith)/(Time(Ith)+Time(<Ith))

Figure 4:
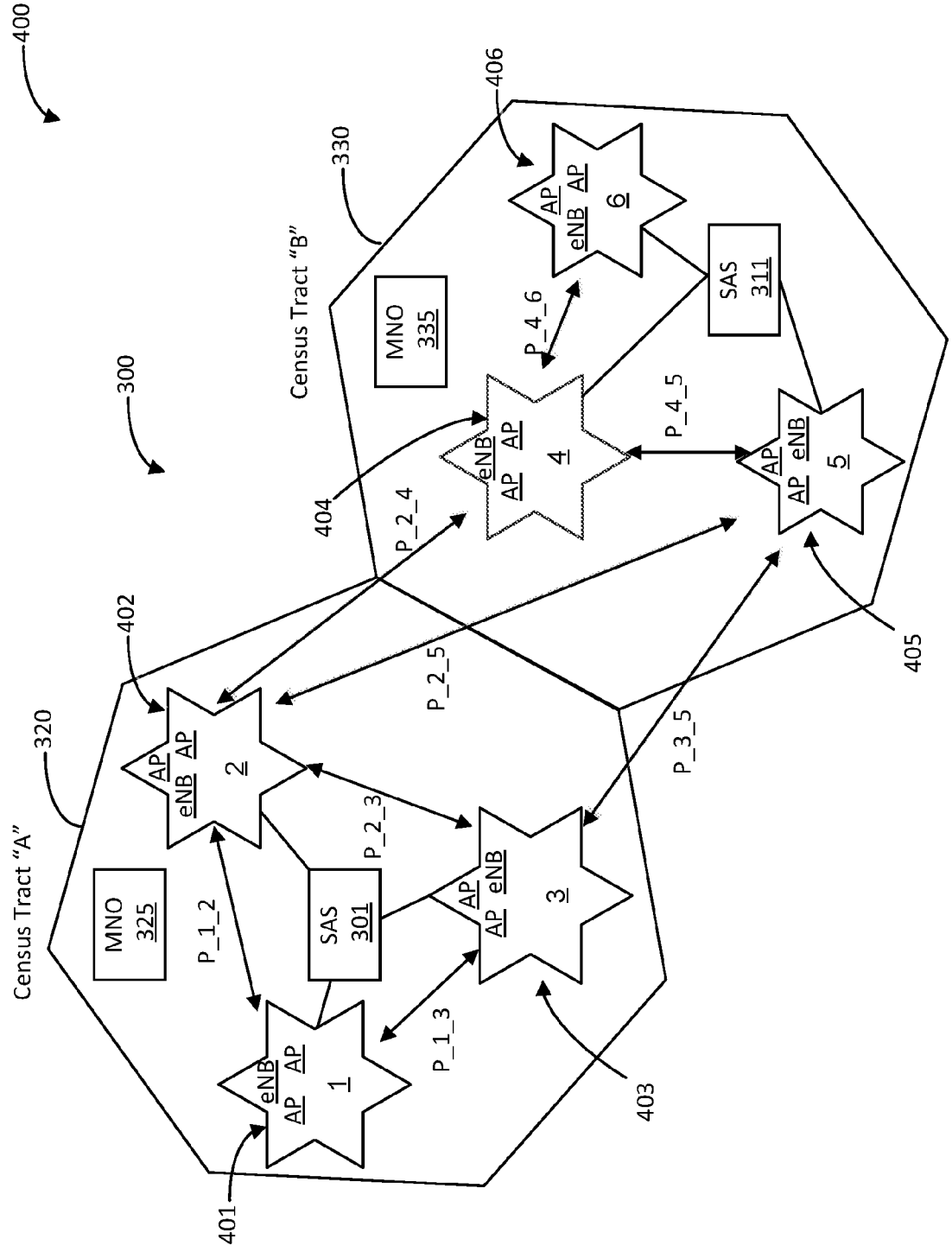

FIG. 4 is a block diagram illustrating another view 400 of components and communication in the network infrastructure 300 of FIG. 3. In this example, instead of deriving the interference metric between specific CBSDs/BS/eNB/AP/etc., several CBSDs/BS/eNB/AP/etc. may be grouped together. For example, as shown in FIG. 4, groups 401-406 include an eNB and two APs, although other groupings of infrastructure components are possible. The grouping of the individual components may be based on proximity of the group components to each other. In this case, the exact configuration of CBSDs/BS/eNB/AP/etc. and their exact number, location, etc. may be obfuscated. For example, the SAS 301 may only receive a location representing the group 401 rather than each and every access point. This obfuscating of data may be advantage to an MNO, such as MNO 325, for which the specific configuration information is a key asset and should not be shared.

In some embodiments, the interference relationship may then be expressed between the groups. For example, an interference metric "P_x_y" may be derived between "x" and "y" groups. The interference metric between groups x and y can be conducted using any of the techniques described herein. As noted above, a single metric can address both interference directions (x→y and y→x) or independent metrics may be defined for both directions. A single metric can address both interference directions (x→y and y→x) or an independent metric may be defined for both directions.

In one embodiment, the members of each group are selected in such a way that interference between them is minimized: intra-group interference mitigation assuming that a group belongs to a single MNO. In this case, a self-organizing network (SON) type interference mitigation through radio resource management (RRM) can be performed or cell measurements and feedback information (such as channel conditions, precoding matrix index (PMI) exchanged between "n" members may be used. The "n out of m" members creating best interference conditions to each other may be grouped together. The remaining members that create worse interference conditions may be given different resource allocation to keep them separated.

In some embodiments, the determined interference metric may be used to mitigate inter-group interference through optimized frequency allocation. For example, each member of a group (e.g., groups 401-406) may monitor interference and reports measurements to a SAS (e.g., SASs 301,311) that is in charge of resource allocation. This report can be, for example, per time slot or other metrics defined by SAS. If the total interference experienced by members is less than the current time slot, the resource allocation for the next frame may be randomly changed. For example, among a group of Base Stations (or other network nodes) the usage of frequency/time resources may be randomly changed between the members of the group (e.g., when group member Base Station "A" uses the 3.500-3.510 GHz band (assuming it is part of the spectrum allocated to this group). In some situations, a high level of interference is observed at the next time slot. Because of this, group member Base Station "A" may be moved by the SAS to the 3.510-3.520 GHz band (assuming it is part of the spectrum allocated to this group) and the SAS will be evaluated if the observed interference is lower. If the observed interference is lower, then this configuration may be used in future configurations. If not, then the configuration may again be changed for future time slots. If the level of interference has not changed, the resource allocation remains unchanged for the next time slot. The random re-distribution of frequency allocation based on interference levels might alleviate colliding interferer and as such reduce interference.

In alternative embodiments, the members of a group may be allocated a different spectrum so that interference is avoided. For example, each group has "n" members and resource allocation is done in groups of "n" spectrum blocks. As such, there are a determined number of (e.g., total number of spectrum blocks/n) groups of spectrum blocks that can be allocated freely. The specific tasks/required functions in the concerned CBSDs (i.e., BS, eNBs, APs, Small Cells, etc.) and possibly within the SAS component(s)

and possibly within the concerned UE is similar to what is described above—with the only difference that groups of infrastructure components need to be considered.

In some embodiments, a master component (such as a SAS component or master infrastructure component) may not have access to specific infrastructure components but only groups of infrastructure components. There may be also hybrid configurations where some infrastructure components are directly accessible while others are organized in groups. Such a group may need to be pre-determined by the concerned MNOs (e.g., MNO 325, 311). In some situations, one of the infrastructure components may be determined to be the group-master (i.e., the master of a specific group of infrastructure components, there are may be many for such groups with a (but not necessarily different) master for each group). The overall master component (such as a SAS component, master infrastructure component, etc.) may interact with the concerned group-masters.

Trigger signals for transmissions of learning/training sequences may be provided to the concerned group-master and the group master triggers the concerned infrastructure components (and possibly mobile devices) within its concerned group. All concerned infrastructure components may send the training sequences at the same time. In this way, the overall master (SAS component, Infrastructure component master) has no knowledge about the specific locations/configurations/etc. of the infrastructure components of a given group.

In some embodiments, the group-master may transmit trigger signals that active sequential transmissions of a plurality of (training/learning) sequences from either a single infrastructure component or a sub-groups of infrastructure components within the concerned group. The other groups of infrastructure components may then determine corresponding interference metrics (e.g., created by a group of infrastructure components onto a neighboring group of infrastructure components). The group-master of each group may later deliver its interference metrics to the overall master (SAS component, overall infrastructure component master). The overall master may provide decisions on the best allocation of available frequency bands to the groups. It is possible that only one frequency band is available for a given group. In such cases, the corresponding resources may be suitably shared by the concerned infrastructure components, for example, through usage of a contention based access scheme (such as WiFi does with CSMA and its evolutions) or through allocation of transmission/reception time slots or usage of suitable interference mitigation schemes such as dirty paper coding, etc.

In alternative embodiments, multiple frequency bands may be available for a given group. In such cases, the overall master provides decisions on frequency bands that are available for usage by a specific group. The group master performs the specific allocation of those frequency bands to the infrastructure components within a group. As mentioned above, a group of infrastructure components may have a sub-set of frequency bands to choose from. In this case, all those allowed frequency bands should be allocated to (e.g., simultaneously) transmit infrastructure components during the phase when the interference metrics are determined. After reporting of interference metrics to the overall master, the overall master may provide decisions on frequency bands that are available for usage by a specific group. The group master may perform the specific allocation of those frequency bands to the infrastructure components within a group.

The behavior of UE is the same as debased above. However, there may be a difference in the group case when several infrastructure components are simultaneously transmitting a training/learning sequence. In that case the UE may become active (e.g., either for staying silent, for sensing, for emulating transmissions of infrastructure component(s), etc.). The active phase may be applied for all UEs attached to the active Infrastructure components and not just to a single infrastructure component that is active at a given time.

Figure 5:
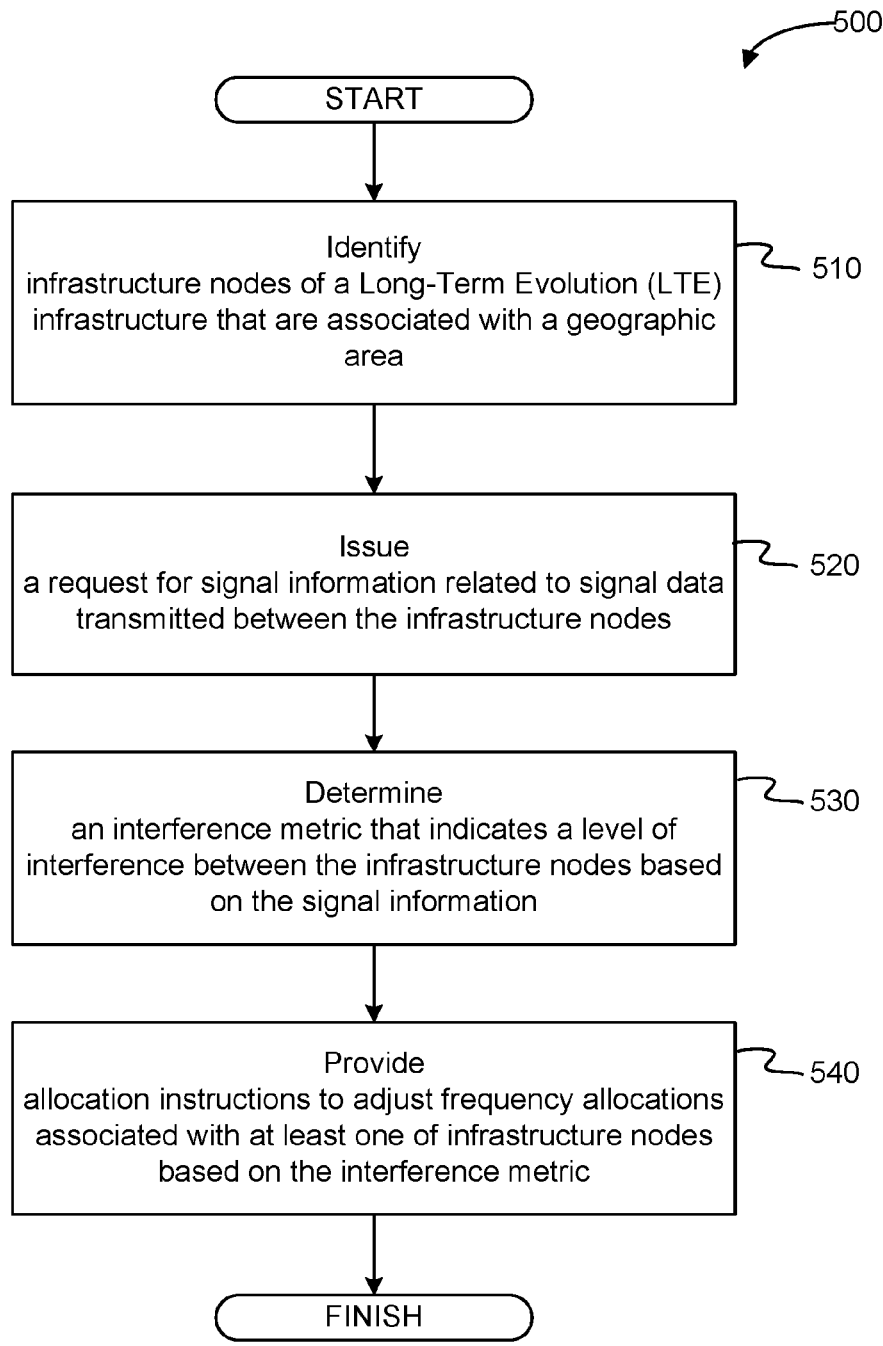

FIG. 5 illustrates a flowchart of an example method of mitigating interference in a network infrastructure, according to an embodiment. Method 500 may be performed by processing logic that may comprise hardware (e.g., circuitry, dedicated logic, programmable logic, microcode, etc.), software (such as instructions run on a processing device), firmware, or a combination thereof. In one embodiment, the electronic device 100 in FIG. 1 may perform method 500. Although shown in a particular sequence or order, unless otherwise specified, the order of the processes can be modified. Thus, the illustrated implementations should be understood only as examples, and the illustrated processes can be performed in a different order, and some processes may be performed in parallel. Additionally, one or more processes can be omitted in various embodiments. Thus, not all processes are required in every implementation. Other process flows are possible.

Beginning in block 510 method 500 identifies infrastructure nodes of a LTE infrastructure. The infrastructure nodes are associated with a geographic area. In block 520, a request for signal information related to signal data transmitted between the infrastructure nodes is issued. An interference metric that indicates a level of interference between the infrastructure nodes based on the signal information is determined in block 530. In block 540, allocation instructions are provided to adjust frequency allocations associated with at least one of infrastructure nodes based on the interference metric.

Figure 6:
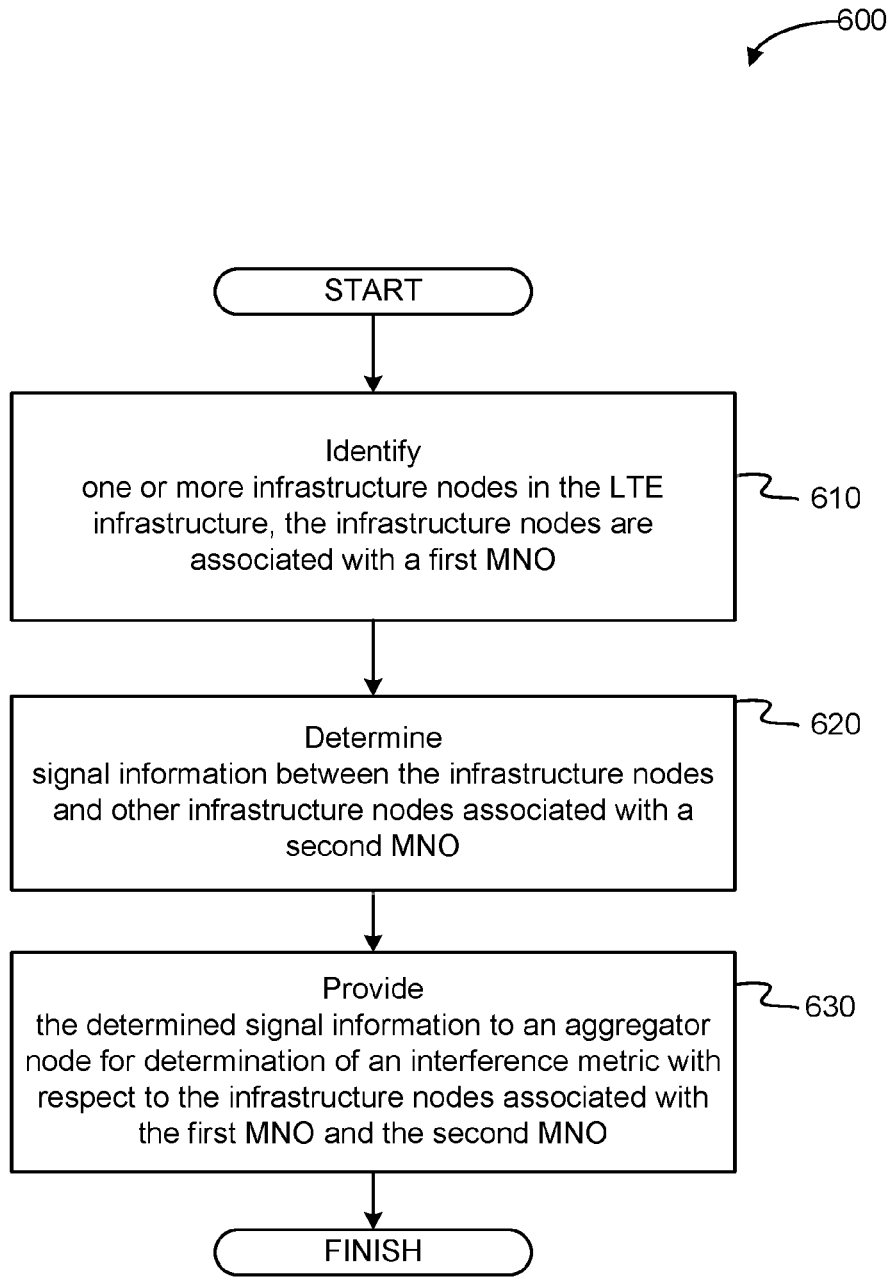

FIG. 6 illustrates a flowchart of an example method of mitigating interference between mobile network operators, according to an embodiment. Method 600 may be performed by processing logic that may comprise hardware (e.g., circuitry, dedicated logic, programmable logic, microcode, etc.), software (such as instructions run on a processing device), firmware, or a combination thereof. In one embodiment, the electronic device 100 in FIG. 1 may perform method 600. Although shown in a particular sequence or order, unless otherwise specified, the order of the processes can be modified. Thus, the illustrated implementations should be understood only as examples, and the illustrated processes can be performed in a different order, and some processes may be performed in parallel. Additionally, one or more processes can be omitted in various embodiments. Thus, not all processes are required in every implementation. Other process flows are possible.

Method 600 begins in block 610 where one or more infrastructure nodes in a LTE infrastructure are identified. The infrastructure nodes are associated with a first MNO. In block 620, signal information between the infrastructure nodes and other infrastructure nodes associated with a second MNO is determined. In block 630, the determined signal information is provide to an aggregator node for determination of an interference metric with respect to the infrastructure nodes associated with the first MNO and the second MNO.

Figure 7:
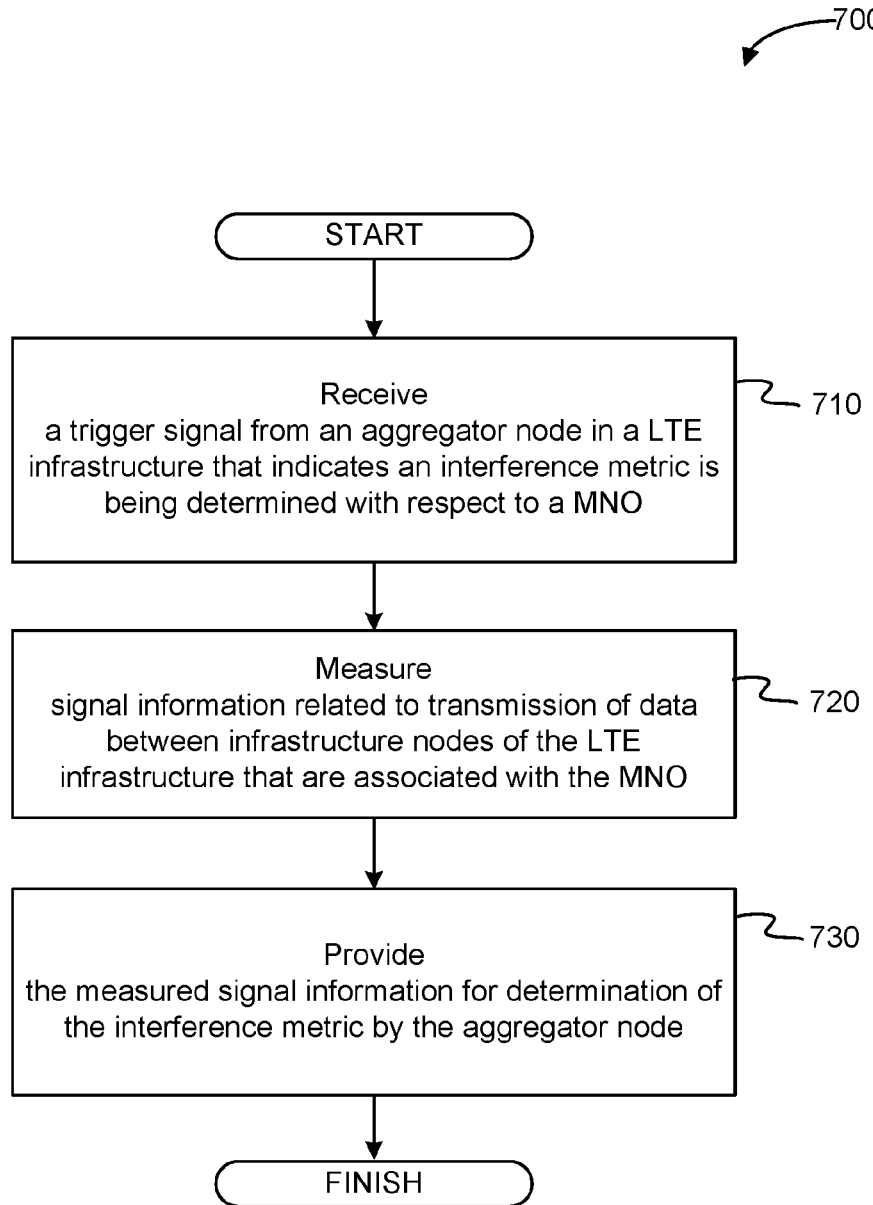

FIG. 7 illustrates a flowchart of an example method of mitigating interference between mobile network operators, according to an embodiment. Method 700 may be performed by processing logic that may comprise hardware (e.g., circuitry, dedicated logic, programmable logic, microcode, etc.), software (such as instructions run on a processing device), firmware, or a combination thereof. In one embodiment, the electronic device 100 in FIG. 1 may perform method 700. Although shown in a particular sequence or order, unless otherwise specified, the order of the processes can be modified. Thus, the illustrated implementations should be understood only as examples, and the illustrated processes can be performed in a different order, and some processes may be performed in parallel. Additionally, one or more processes can be omitted in various embodiments. Thus, not all processes are required in every implementation. Other process flows are possible.

Method 700 begins in block 710 where a trigger signal from an aggregator node in a LTE infrastructure is received. The trigger signal indicates that an interference metric is being determined with respect to a MNO. Responsive to receiving the trigger signal, signal information related to transmission of data between infrastructure nodes of the LTE infrastructure that are associated with the MNO is measured in block 720. In block 730, the measured signal information is provided for determination of the interference metric by the aggregator node.

Figure 8:
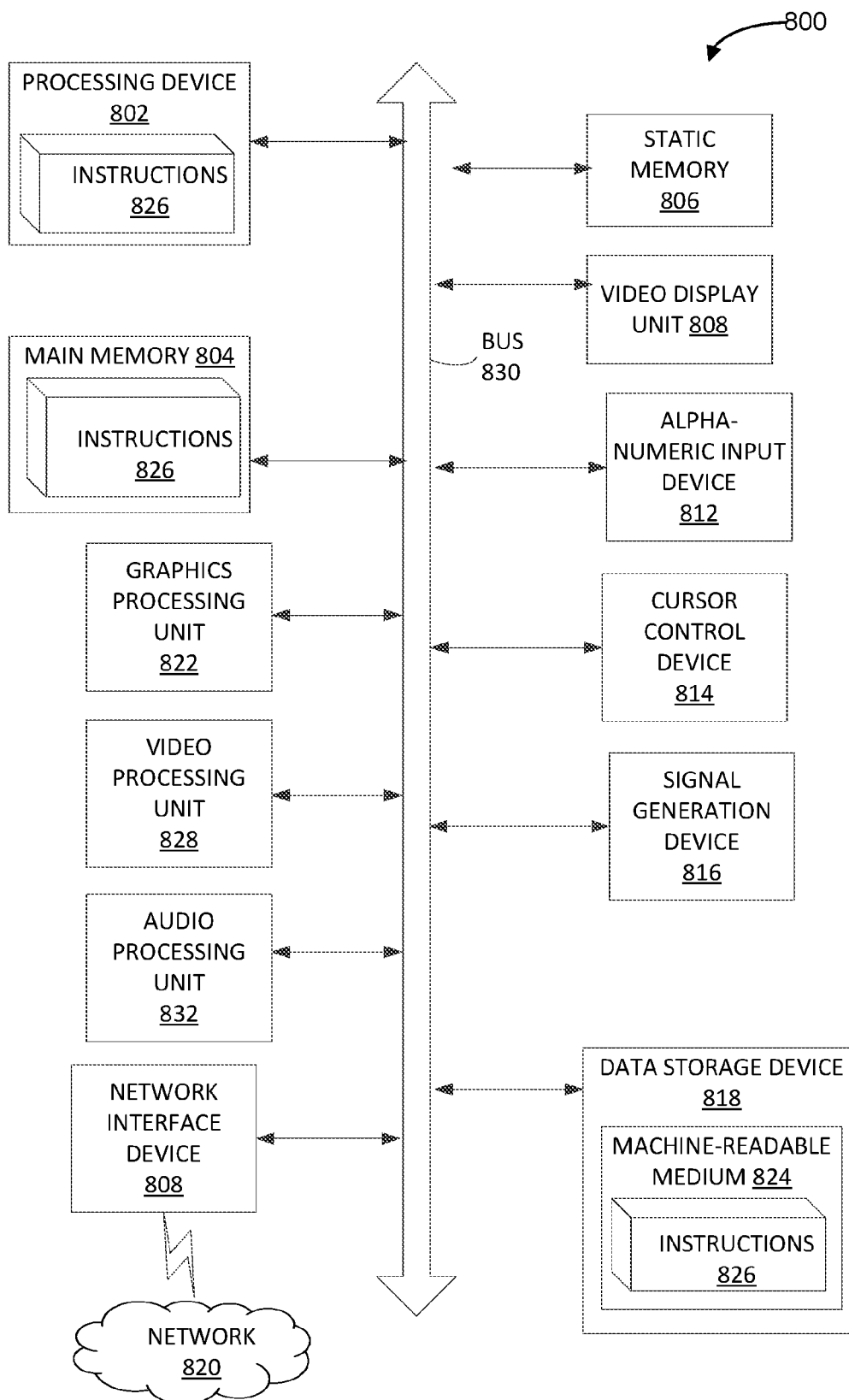

FIG. 8 illustrates a diagrammatic representation of a machine in the example form of a computer system 800 within which a set of instructions, for causing the machine to perform any one or more of the methodologies discussed herein, may be executed. In alternative embodiments, the machine may be connected (e.g., networked) to other machines in a LAN, an intranet, an extranet, or the Internet. The machine may operate in the capacity of a server or a client device in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The computer system 800 includes a processing device 802, a main memory 804 (e.g., read-only memory (ROM), flash memory, dynamic random access memory (DRAM) (such as synchronous DRAM (SDRAM) or DRAM (RDRAM), etc.), a static memory 806 (e.g., flash memory, static random access memory (SRAM), etc.), and a data storage device 818, which communicate with each other via a bus 830.

Processing device 802 represents one or more general-purpose processing devices such as a microprocessor, central processing unit, or the like. More particularly, the processing device may be complex instruction set computing (CISC) microprocessor, reduced instruction set computer (RISC) microprocessor, very long instruction word (VLIW) microprocessor, or processor implementing other instruction sets, or processors implementing a combination of instruction sets. Processing device 802 may also be one or more special-purpose processing devices such as an application specific integrated circuit (ASIC), a field programmable gate array (FPGA), a digital signal processor (DSP), network processor, or the like. In one embodiment, processing device 802 may include one or processing cores. The processing device 802 is configured to execute the processing logic 826 for performing the operations and steps discussed herein. In one embodiment, processing device 802 is the same as processing device 104e described with respect to FIG. 1 that implement techniques for providing SAS interference mitigation options as described herein with embodiments of the disclosure.

The computer system 800 may further include a network interface device 808 communicably coupled to a network 820. The computer system 800 also may include a video display unit 810 (e.g., a liquid crystal display (LCD) or a cathode ray tube (CRT)), an alphanumeric input device 812 (e.g., a keyboard), a cursor control device 814 (e.g., a mouse), and a signal generation device 816 (e.g., a speaker). Furthermore, computer system 800 may include a graphics processing unit 822, a video processing unit 828, and an audio processing unit 832.

The data storage device 818 may include a machine-accessible storage medium 824 on which is stored software 826 implementing any one or more of the methodologies of functions of the metric generator 225 as described herein, such as implementing techniques for providing SAS interference mitigation options on threads in a processing device as described above. The software 826 may also reside, completely or at least partially, within the main memory 804 as instructions 826 and/or within the processing device 802 as processing logic 826 during execution thereof by the computer system 800; the main memory 804 and the processing device 802 also constituting machine-accessible storage media.

The machine-readable storage medium 824 may include a non-transitory machine-accessible storage medium that is used to store instructions 826 implementing techniques for providing SAS interference mitigation options on threads in a processing device such as described with respect to processing device 100 in FIG. 1, and/or a software library containing methods that call the above applications. While the machine-accessible storage medium 828 is shown in an example embodiment to be a single medium, the term "machine-accessible storage medium" should be taken to include a single medium or multiple media (e.g., a centralized or distributed database, and/or associated caches and servers) that store the one or more sets of instructions. The term "machine-accessible storage medium" shall also be taken to include any medium that is capable of storing, encoding or carrying a set of instruction for execution by the machine and that cause the machine to perform any one or more of the methodologies of the disclosure. The term "machine-accessible storage medium" shall accordingly be taken to include, but not be limited to, solid-state memories, and optical and magnetic media.

The foregoing description of one or more implementations provides illustration and description, but is not intended to be exhaustive or to limit the scope of the disclosure to the precise form disclosed. Modifications and variations are possible in light of the above teachings or may be acquired from practice of various implementations.

The following examples pertain to further embodiments.

Example 1 may include an apparatus of an evolved Node B (eNB) comprising: a memory to store a data sequence, and one or more processing devices coupled to the memory, the processing devices to: generate an interference metric associated with a first group and a second group of infrastructure nodes of a Long-Term Evolution (LTE) network infrastructure based on measurement information, the measurement information comprises measurements related to the transmission of data sequences associated with the first group and the second group; and determine configuration settings for infrastructure nodes of the first group and second group based on the generated interference metric, each configuration setting represents a frequency band and transmission power level for a corresponding infrastructure node to access data in the LTE network infrastructure.

Example 2 may include the apparatus of the eNB of Example 1, wherein the apparatus is further included in a Spectrum Access System (SAS) node.

Example 3 may include the apparatus of the eNB of Example 1, further comprising radio frequency circuitry to transmit the configuration settings to the infrastructure nodes of the first group and second group.

Example 4 may include the apparatus of the eNB of Examples 1, 2 or 3, wherein the interference metric comprises data related to an amount of interference between the first group and the second group of infrastructure nodes of the LTE network infrastructure.

Example 5 may include the apparatus of the eNB of Examples 1, 2 or 3, wherein the measurement information comprises at least one of: information on signal propagation characteristics, signal strength or output power levels associated with the infrastructure nodes.

Example 6 may include the apparatus of the eNB of Examples 1, 2 or 3, wherein the processing devices further to adjust an allocation of spectrum to at least one of the infrastructure nodes based on the determined interference metrics.

Example 7 may include the apparatus of the eNB of Examples 1, 2 or 3, wherein the processing devices further to adjust an activation sequence of the one or more of the infrastructure nodes based on the determined interference metrics.

Example 8 may include the apparatus of the eNB of Examples 1, 2 or 3, wherein the processing devices further to adjust transmission power levels of one or more of the infrastructure nodes based on the determined interference metrics.

Example 9 may include a computer readable storage medium storing executable instructions, that when executed by one or more processing devices, cause the processing devices to: generate, by the processing devices, an interference metric associated with a first group and a second group of infrastructure nodes of a Long-Term Evolution (LTE) network infrastructure based on measurement information, the measurement information comprises measurements related to the transmission of data sequences associated with the first group and the second group; and determine configuration settings for infrastructure nodes of the first group and second group based on the generated interference metric, each configuration setting represents a frequency band and transmission power level for a corresponding infrastructure node to access data in the LTE network infrastructure.

Example 10 may include the computer readable storage medium of Example 17, wherein the processing devices are associated with an evolved Node B (eNB) included in a Spectrum Access System (SAS) node.

Example 11 may include the computer readable storage medium of Example 17, wherein the processing devices are further to transmit the configuration settings to the infrastructure nodes of the first group and second group.

Example 12 may include the computer readable storage medium of Examples 9, 10 or 11, wherein the interference metric comprises data related to an amount of interference between the first group and the second group of infrastructure nodes of the LTE network infrastructure.

Example 13 may include the computer readable storage medium of Examples 9, 10 or 11, wherein the measurement information comprises at least one of: information on signal propagation characteristics, signal strength or output power levels associated with the infrastructure nodes.

Example 14 may include the computer readable storage medium of Examples 9, 10 or 11, wherein the processing devices further to adjust an allocation of spectrum to at least one of the infrastructure nodes based on the determined interference metrics.

Example 15 may include the computer readable storage medium of Examples 9, 10 or 11, wherein the processing devices further to adjust an activation sequence of the one or more of the infrastructure nodes based on the determined interference metrics.

Example 16 may include the computer readable storage medium of Examples 9, 10 or 11, wherein the processing devices further to adjust transmission power levels of one or more of the infrastructure nodes based on the determined interference metrics.

Example 17 may include an apparatus comprising: a memory to store a data sequence, and one or more processing devices coupled to the memory, the processing devices to: generate, by the processing devices, an interference metric associated with a first group and a second group of infrastructure nodes of a Long-Term Evolution (LTE) network infrastructure based on measurement information, the measurement information comprises measurements related to the transmission of data sequences associated with the first group and the second group; and determine configuration settings for infrastructure nodes of the first group and second group based on the generated interference metric, each configuration setting represents a frequency band and transmission power level for a corresponding infrastructure node to access data in the LTE network infrastructure.

Example 18 may include the apparatus of Example 17, wherein the apparatus is further included in a Spectrum Access System (SAS) node.

Example 19 may include the apparatus of Example 17, further comprising radio frequency circuitry to transmit the configuration settings to the infrastructure nodes of the first group and second group.

Example 20 may include the apparatus of Examples 17, 18 or 19, wherein the interference metric comprises data related to an amount of interference between the first group and the second group of infrastructure nodes of the LTE network infrastructure.

Example 21 may include the apparatus of Examples 17, 18 or 19, wherein the measurement information comprises at least one of: information on signal propagation characteristics, signal strength or output power levels associated with the infrastructure nodes.

Example 22 may include the apparatus of Examples 17, 18 or 19, wherein the processing devices further to adjust an allocation of spectrum to at least one of the infrastructure nodes based on the determined interference metrics.

Example 23 may include the apparatus of Examples 17, 18 or 19, wherein the processing devices further to adjust an activation sequence of the one or more of the infrastructure nodes based on the determined interference metrics.

Example 24 may include the apparatus of Examples 17, 18 or 19, wherein the processing devices further to adjust transmission power levels of one or more of the infrastructure nodes based on the determined interference metrics.

Example 25 may include an apparatus comprising: one or more processing devices; means for generating an interference metric associated with a first group and a second group of infrastructure nodes of a Long-Term Evolution (LTE) network infrastructure based on measurement information, the measurement information comprises measurements related to the transmission of data sequences associated with the first group and the second group; and means for determining configuration settings for infrastructure nodes of the first group and second group based on the generated interference metric, each configuration setting represents a frequency band and transmission power level for a corresponding infrastructure node to access data in the LTE network infrastructure.

Example 26 may include a method comprising, generating, by one or more processing devices, an interference metric associated with a first group and a second group of infrastructure nodes of a Long-Term Evolution (LTE) network infrastructure based on measurement information, the measurement information comprises measurements related to the transmission of data sequences associated with the first group and the second group; and determining, by the one or more processing devices, configuration settings for infrastructure nodes of the first group and second group based on the generated interference metric, each configuration setting represents a frequency band and transmission power level for a corresponding infrastructure node to access data in the LTE network infrastructure.

Example 27 may include the method of Example 26, wherein the processing devices are associated with an evolved Node B (eNB) included in a Spectrum Access System (SAS) node.

Example 28 may include the method of Example 26, further comprising generating uplink data associated with the configuration settings to transmit to the infrastructure nodes of the first group and second group.

Example 29 may include the method of Examples 26, 27 or 28, wherein the interference metric comprises data related to an amount of interference between the first group and the second group of infrastructure nodes of the LTE network infrastructure.

Example 30 may include the method of Examples 26, 27 or 28, wherein the measurement information comprises at least one of: information on signal propagation characteristics, signal strength or output power levels associated with the infrastructure nodes.

Example 31 may include the method of Examples 26, 27 or 28, wherein the processing devices further to adjust an allocation of spectrum to at least one of the infrastructure nodes based on the determined interference metrics.

Example 32 may include the method of Examples 26, 27 or 28, wherein the processing devices further to adjust an activation sequence of the one or more of the infrastructure nodes based on the determined interference metrics.

Example 33 may include the method of Examples 26, 27 or 28, wherein the processing devices further to adjust transmission power levels of one or more of the infrastructure nodes based on the determined interference metrics.

Example 34 may include a spectrum access system (SAS) comprising: a memory device and a processor, wherein the processor is configured to perform the method of any of Examples 26-33.

Example 35 may include an apparatus of an evolved Node B (eNB) comprising: a memory to store a data sequence, and one or more processing devices coupled to the memory, the processing devices to: identify infrastructure nodes of a LTE network infrastructure, the infrastructure nodes are associated with a geographic area; issue a request for signal information related to signal data transmitted between the infrastructure nodes; determine an interference metric that indicates a level of interference between the infrastructure nodes based on the signal information; and provide allocation instructions to adjust frequency allocations associated with at least one of infrastructure nodes based on the interference metric.

Example 36 may include the apparatus of the eNB of Example 35, wherein the signal information comprises at least one of: information on propagation characteristics, signal strength or output power levels associated with the identify infrastructure nodes.

Example 37 may include the apparatus of the eNB of Example 35, wherein the processing devices are further to determine the interference metric during a dedicated time phase in which a sub-set of the identify infrastructure nodes is not transmitting.

Example 38 may include the apparatus of the eNB of Examples 36 or 37, wherein the determined interference metric comprises data related to interference between a first and a second infrastructure node of the LTE infrastructure.

Example 39 may include the apparatus of the eNB of Examples 36 or 37, wherein the determined interference metric comprises data related to interference between a first group of related infrastructure nodes and a second group of related infrastructure nodes of the LTE network infrastructure.

Example 40 may include the apparatus of the eNB of Examples 36 or 37, wherein the allocation instructions further to adjust an amount of spectrum allocated to the at least one of the infrastructure nodes based on the determined interference metric.

Example 41 may include the apparatus of the eNB of Examples 36 or 37, wherein the allocation instructions further to optimize spectrum allocated to frequency spot of a mobile network operator (MNO) associated with the at least one of the infrastructure nodes based on the determined interference metric.

Example 42 may include a computer readable storage medium storing executable instructions, that when executed by one or more processing devices, cause the processing devices to: identify infrastructure nodes of a LTE network infrastructure, the infrastructure nodes are associated with a geographic area; issue a request for signal information related to signal data transmitted between the infrastructure nodes; determine an interference metric that indicates a level of interference between the infrastructure nodes based on the signal information; and provide allocation instructions to adjust frequency allocations associated with at least one of infrastructure nodes based on the interference metric.

Example 43 may include the computer-readable medium of Example 42, wherein the signal information comprises at least one of: information on propagation characteristics, signal strength or output power levels associated with the identify infrastructure nodes.

Example 44 may include the computer-readable medium of Example 42, wherein the processing devices are further to determine the interference metric during a dedicated time phase in which a sub-set of the identify infrastructure nodes is not transmitting.

Example 45 may include the computer readable storage medium of Examples 43 or 44, wherein the determined interference metric comprises data related to interference between a first and a second infrastructure node of the LTE infrastructure.

Example 46 may include the computer readable storage medium of Examples 43 or 44, wherein the determined interference metric comprises data related to interference between a first group of related infrastructure nodes and a second group of related infrastructure nodes of the LTE network infrastructure.

Example 47 may include the computer readable storage medium of Examples 43 or 44, wherein the allocation instructions further to adjust an amount of spectrum allocated to the at least one of the infrastructure nodes based on the determined interference metric.

Example 48 may include the computer readable storage medium of Examples 43 or 44, wherein the allocation instructions further to optimize spectrum allocated to frequency spot of a mobile network operator (MNO) associated with the at least one of the infrastructure nodes based on the determined interference metric.

Example 49 may include an apparatus comprising: a memory to store a data sequence, and one or more processing devices coupled to the memory, the processing devices to: identify infrastructure nodes of a LTE network infrastructure, the infrastructure nodes are associated with a geographic area; issue a request for signal information related to signal data transmitted between the infrastructure nodes; determine an interference metric that indicates a level of interference between the infrastructure nodes based on the signal information; and provide allocation instructions to adjust frequency allocations associated with at least one of infrastructure nodes based on the interference metric.

Example 50 may include the apparatus of Example 49, wherein the signal information comprises at least one of: information on propagation characteristics, signal strength or output power levels associated with the identify infrastructure nodes.

Example 51 may include the apparatus of Example 49, wherein the processing devices are further to determine the interference metric during a dedicated time phase in which a sub-set of the identify infrastructure nodes is not transmitting.

Example 52 may include the apparatus of Examples 50 or 51, wherein the determined interference metric comprises data related to interference between a first and a second infrastructure node of the LTE infrastructure.

Example 53 may include the apparatus of Examples 50 or 51, wherein the determined interference metric comprises data related to interference between a first group of related infrastructure nodes and a second group of related infrastructure nodes of the LTE network infrastructure.

Example 54 may include the apparatus of Examples 50 or 51, wherein the allocation instructions further to adjust an amount of spectrum allocated to the at least one of the infrastructure nodes based on the determined interference metric.

Example 55 may include the apparatus of Examples 50 or 51, wherein the allocation instructions further to optimize spectrum allocated to frequency spot of a mobile network operator (MNO) associated with the at least one of the infrastructure nodes based on the determined interference metric.

Example 56 may include an apparatus comprising: one or more processing devices; means for identifying infrastructure nodes of a LTE network infrastructure, the infrastructure nodes are associated with a geographic area; means for issuing a request for signal information related to signal data transmitted between the infrastructure nodes; means for determining an interference metric that indicates a level of interference between the infrastructure nodes based on the signal information; and means for providing allocation instructions to adjust frequency allocations associated with at least one of infrastructure nodes based on the interference metric.

Example 57 may include a method comprising, identify infrastructure nodes of a LTE network infrastructure, the infrastructure nodes are associated with a geographic area; issue a request for signal information related to signal data transmitted between the infrastructure nodes; determine an interference metric that indicates a level of interference between the infrastructure nodes based on the signal information; and provide allocation instructions to adjust frequency allocations associated with at least one of infrastructure nodes based on the interference metric.

Example 58 may include the method of Example 57, wherein the signal information comprises at least one of: information on propagation characteristics, signal strength or output power levels associated with the identify infrastructure nodes.

Example 59 may include the method of Example 57, wherein the processing devices are further to determine the interference metric during a dedicated time phase in which a sub-set of the identify infrastructure nodes is not transmitting.

Example 60 may include the method of Examples 58 or 59, wherein the determined interference metric comprises data related to interference between a first and a second infrastructure node of the LTE infrastructure.

Example 61 may include the method of Examples 58 or 59, wherein the determined interference metric comprises data related to interference between a first group of related infrastructure nodes and a second group of related infrastructure nodes of the LTE network infrastructure.

Example 62 may include the method of Examples 58 or 59, wherein the allocation instructions further comprises adjusting an amount of spectrum allocated to the at least one of the infrastructure nodes based on the determined interference metric.

Example 63 may include the method of Examples 58 or 59, wherein the allocation instructions further comprises optimizing spectrum allocated to a frequency spot of a mobile network operator (MNO) associated with the at least one of the infrastructure nodes based on the determined interference metric.

Example 64 may include a spectrum access system (SAS) comprising: a memory device and a processor, wherein the processor is configured to perform the method of any of Examples 57-63.

Example 65 may include an apparatus of an evolved Node B (eNB) comprising: a memory to store a data sequence, and one or more processing devices coupled to the memory, the processing devices to: identify one or more infrastructure nodes in the LTE network infrastructure, the infrastructure nodes are associated with a first mobile network operator (MNO); determine signal information between the infrastructure nodes and other infrastructure nodes associated with a second MNO; and provide the determined signal information to an aggregator node for determination of an interference metric with respect to the infrastructure nodes associated with the first MNO and the second MNO.

Example 66 may include the apparatus of the eNB of Example 1, wherein the signal information comprises at least one of: information on propagation characteristics, signal strength or output power levels associated with the identify infrastructure nodes.

Example 67 may include the apparatus of the eNB of Example 1, wherein the aggregator node is included in a Spectrum Access System (SAS) node.

Example 68 may include the apparatus of the eNB of Examples 66 or 67, wherein the determined interference metric comprises data related to interference between a first infrastructure node of the first MNO and a second infrastructure node of the second MNO.

Example 69 may include the apparatus of the eNB of Examples 66 or 67, wherein the determined interference metric comprises data related to interference between a first group of related infrastructure nodes of the first MNO and a second group of related infrastructure nodes of the second MNO.

Example 70 may include the apparatus of the eNB of Examples 66 or 67, wherein the processing devices are further to silence transmission from the infrastructure nodes associated with the first MNO during determination of the interference metric by the other infrastructure nodes associate with the second MNO.

Example 71 may include a computer readable storage medium storing executable instructions, that when executed by one or more processing devices, cause the processing devices to: identify, by the processing devices, one or more infrastructure nodes in the LTE network infrastructure, the infrastructure nodes are associated with a first mobile network operator (MNO); determine signal information between the infrastructure nodes and other infrastructure nodes associated with a second MNO; and provide the determined signal information to an aggregator node for determination of an interference metric with respect to the infrastructure nodes associated with the first MNO and the second MNO.

Example 72 may include the computer readable storage medium of Example 71, wherein the signal information comprises at least one of: information on propagation characteristics, signal strength or output power levels associated with the identify infrastructure nodes.

Example 73 may include the computer readable storage medium of Example 71, wherein the aggregator node is included in a Spectrum Access System (SAS) node.

Example 74 may include the computer readable storage medium of Examples 72 or 73, wherein the determined interference metric comprises data related to interference between a first infrastructure node of the first MNO and a second infrastructure node of the second MNO.

Example 75 may include the computer readable storage medium of Examples 72 or 73, wherein the determined interference metric comprises data related to interference between a first group of related infrastructure nodes of the first MNO and a second group of related infrastructure nodes of the second MNO.

Example 76 may include the computer readable storage medium of Examples 72 or 73, wherein the processing devices are further to silence transmission from the infrastructure nodes associated with the first MNO during determination of the interference metric by the other infrastructure nodes associate with the second MNO.

Example 77 may include an apparatus comprising: a memory to store a data sequence, and one or more processing devices coupled to the memory, the processing devices to: identify one or more infrastructure nodes in the LTE network infrastructure, the infrastructure nodes are associated with a first mobile network operator (MNO); determine signal information between the infrastructure nodes and other infrastructure nodes associated with a second MNO; and provide the determined signal information to an aggregator node for determination of an interference metric with respect to the infrastructure nodes associated with the first MNO and the second MNO.

Example 78 may include the apparatus of Example 77, wherein the signal information comprises at least one of: information on propagation characteristics, signal strength or output power levels associated with the identify infrastructure nodes.

Example 79 may include the apparatus of Example 77, wherein the aggregator node is included a Spectrum Access System (SAS) node.

Example 80 may include the apparatus of Examples 78 or 79, wherein the determined interference metric comprises data related to interference between a first infrastructure node of the first MNO and a second infrastructure node of the second MNO.

Example 81 may include the apparatus of Examples 78 or 79, wherein the determined interference metric comprises data related to interference between a first group of related infrastructure nodes of the first MNO and a second group of related infrastructure nodes of the second MNO.

Example 82 may include the apparatus of Examples 78 or 79, wherein the processing devices are further to silence transmission from the infrastructure nodes associated with the first MNO during determination of the interference metric by the other infrastructure nodes associate with the second MNO.

Example 83 may include an apparatus comprising: one or more processing devices; means for identifying one or more infrastructure nodes in the LTE network infrastructure, the infrastructure nodes are associated with a first mobile network operator (MNO); means for determining signal information between the infrastructure nodes and other infrastructure nodes associated with a second MNO; and means for providing the determined signal information to an aggregator node for determination of an interference metric with respect to the infrastructure nodes associated with the first MNO and the second MNO.

Example 84 may include a method comprising, identifying, by one or more processing devices, one or more infrastructure nodes in the LTE network infrastructure, the infrastructure nodes are associated with a first mobile network operator (MNO); determining, by the processing devices, signal information between the infrastructure nodes and other infrastructure nodes associated with a second MNO; and provide the determined signal information to an aggregator node for determination of an interference metric with respect to the infrastructure nodes associated with the first MNO and the second MNO.

Example 85 may include the method of Example 84, wherein the signal information comprises at least one of: information on propagation characteristics, signal strength or output power levels associated with the identify infrastructure nodes.

Example 86 may include the method of Example 84, wherein the aggregator node is included a Spectrum Access System (SAS) node.

Example 87 may include the method of Examples 85 or 86, wherein the determined interference metric comprises data related to interference between a first infrastructure node of the first MNO and a second infrastructure node of the second MNO.

Example 88 may include the method of Examples 85 or 86, wherein the determined interference metric comprises data related to interference between a first group of related infrastructure nodes of the first MNO and a second group of related infrastructure nodes of the second MNO.

Example 89 may include the method of Examples 85 or 86, wherein the processing devices are further to silence transmission from the infrastructure nodes associated with the first MNO during determination of the interference metric by the other infrastructure nodes associate with the second MNO.

Example 90 may include a spectrum access system (SAS) comprising: a memory device and a processor, wherein the processor is configured to perform the method of any of Examples 84-89.

Example 91 may include an apparatus of a user equipment (UE) comprising: a memory to store a data sequence, and one or more processing devices coupled to the memory, the processing devices to: receive a trigger signal from an aggregator node in the LTE network infrastructure, the trigger signal indicates that an interference metric is being determined with respect to a mobile network operator (MNO); responsive to receiving the trigger signal, measure signal information related to a transmission of a data sequence between infrastructure nodes of the LTE network infrastructure that are associated with the MNO; and provide the measured signal information for determination of the interference metric by the aggregator node.

Example 92 may include the apparatus of the UE of Example 91, wherein the aggregator node is included a Spectrum Access System (SAS) node.

Example 93 may include the apparatus of the UE of Example 91, wherein the aggregator node comprises an evolved Node B (eNB), and wherein to provide comprises the processing devices further to generate uplink data associated with the measured signal information to provide to the eNB.

Example 94 may include the apparatus of the UE of Example 91, wherein the signal information comprises at least one of: information on propagation characteristics, signal strength or output power levels associated with the identify infrastructure nodes.

Example 95 may include the apparatus of the UE of Examples 92, 93 or 94, wherein the determined interference metric comprises data related interference between a first and a second infrastructure node of the LTE infrastructure.

Example 96 may include the apparatus of the UE of Examples 92, 93 or 94, wherein the determined interference metric comprises data related to interference between a first group of related infrastructure nodes and a second group of related infrastructure nodes of the LTE network infrastructure.

Example 97 may include a computer readable storage medium storing executable instructions, that when executed by one or more processing devices, cause the processing devices to: receive, by the processing device, a trigger signal from an aggregator node in the LTE network infrastructure, the trigger signal indicates that an interference metric is being determined with respect to a mobile network operator (MNO); responsive to receiving the trigger signal, measure signal information related to a transmission of a data sequence between infrastructure nodes of the LTE network infrastructure that are associated with the MNO; and provide the measured signal information for determination of the interference metric by the aggregator node.

Example 98 may include the computer readable storage medium of Example 97, wherein the aggregator node is included a Spectrum Access System (SAS) node.

Example 99 may include the computer readable storage medium of Example 97, wherein the aggregator node comprises an evolved Node B (eNB), and wherein to provide comprises the processing devices further to generate uplink data associated with the measured signal information to provide to the eNB.

Example 100 may include the computer readable storage medium of Example 97, wherein the signal information comprises at least one of: information on propagation characteristics, signal strength or output power levels associated with the identify infrastructure nodes.

Example 101 may include the computer readable storage medium of Examples 98, 99 or 100, wherein the determined interference metric comprises data related interference between a first and a second infrastructure node of the LTE infrastructure.

Example 102 may include the computer readable storage medium of Examples 98, 99 or 100, wherein the determined interference metric comprises data related to interference between a first group of related infrastructure nodes and a second group of related infrastructure nodes of the LTE network infrastructure.

Example 103 may include an apparatus comprising: a memory to store a data sequence, and one or more processing devices coupled to the memory, the processing devices to: receive a trigger signal from an aggregator node in the LTE network infrastructure, the trigger signal indicates that an interference metric is being determined with respect to a mobile network operator (MNO); responsive to receiving the trigger signal, measure signal information related to a transmission of a data sequence between infrastructure nodes of the LTE network infrastructure that are associated with the MNO; and provide the measured signal information for determination of the interference metric by the aggregator node.

Example 104 may include the apparatus of Example 103, wherein the aggregator node is included a Spectrum Access System (SAS) node.

Example 105 may include the apparatus of Example 104, wherein the aggregator node comprises an evolved Node B (eNB), and wherein to provide comprises the processing devices further to generate uplink data associated with the measured signal information to provide to the eNB.

Example 106 may include the apparatus of Example 105, wherein the signal information comprises at least one of: information on propagation characteristics, signal strength or output power levels associated with the identify infrastructure nodes.

Example 107 may include the apparatus of Examples 104, 105 or 106, wherein the determined interference metric comprises data related interference between a first and a second infrastructure node of the LTE infrastructure.

Example 108 may include the apparatus of Examples 104, 105 or 106, wherein the determined interference metric comprises data related to interference between a first group of related infrastructure nodes and a second group of related infrastructure nodes of the LTE network infrastructure.

Example 109 may include an apparatus comprising: one or more processing devices; means for receiving a trigger signal from an aggregator node in the LTE network infrastructure, the trigger signal indicates that an interference metric is being determined with respect to a mobile network operator (MNO); means for responsive to receiving the trigger signal, measuring signal information related to a transmission of a data sequence between infrastructure nodes of the LTE network infrastructure that are associated with the MNO; and means for providing the measured signal information for determination of the interference metric by the aggregator node.

Example 110 may include a method comprising, receiving, by one or more processing devices, a trigger signal from an aggregator node in the LTE network infrastructure, the trigger signal indicates that an interference metric is being determined with respect to a mobile network operator (MNO); responsive to receiving the trigger signal, measuring, by the one or more processing devices, signal information related to a transmission of a data sequence between infrastructure nodes of the LTE network infrastructure that are associated with the MNO; and providing the measured signal information for determination of the interference metric by the aggregator node.

Example 111 may include the method of Example 110, wherein the aggregator node is included a Spectrum Access System (SAS) node.

Example 112 may include the method of Example 110, wherein the aggregator node comprises an evolved Node B (eNB), and wherein the providing comprises generating uplink data associated with the measured signal information to provide to the eNB.

Example 113 may include the method of Example 110, wherein the signal information comprises at least one of: information on propagation characteristics, signal strength or output power levels associated with the identify infrastructure nodes.

Example 114 may include the method of Examples 111, 112 or 113, wherein the determined interference metric comprises data related interference between a first and a second infrastructure node of the LTE infrastructure.

Example 115 may include the method of Examples 111, 112 or 113, wherein the determined interference metric comprises data related to interference between a first group of related infrastructure nodes and a second group of related infrastructure nodes of the LTE network infrastructure.

Example 116 may include a non-transitory, computer-readable storage medium including instructions that, when executed by a processor, cause the processor to perform the method of Examples 110-115.

Example 201 may include interference mitigation through creation of interference metrics between selected infrastructure nodes and issuance of corresponding triggers as indicated above.

Example 202 may include interference mitigation by deriving interference metrics between groups of infrastructure components.

Example 203 may include a method performed by an aggregation node in an LTE infrastructure to mitigate interference between mobile network operators. The method may include issuing one or more triggers to request information relating to signals between selected infrastructure nodes. The method may also include determining interference metrics between the selected infrastructure nodes.

Example 204 may include the method of Example 203, wherein the interference metrics are radio access technology agnostic.

Example 205 may include the method of Example 203, wherein the interference metrics are radio access technology specific.

Example 206 may include the methods of any of Examples 203-5, wherein the information relating to signals between selected infrastructure nodes may include one or more of geographic area description information, information on propagation characteristics, and output power levels.

Example 207 may include the methods of any of Examples 203-5 wherein the information relating to signals may include signal powers and determining interference metrics may include performing the sum $$I_p = \sum \frac{P_t G_t G_r \lambda^2}{(4\pi)^2 d^n L},$$

wherein Pt is transmission power, Gt is the transmission antenna gain. Gr is the receiving antenna gain, λ is transmission wavelength, d is the distance between the transmission and reception, n is a path loss coefficient, and L is a system loss factor.

Example 208 may include the methods of any of Examples 203-7, wherein determining interference metrics may include receiving measurements of signals measured by the selected infrastructure nodes.

Example 209 may include the methods of any of Examples 203-7, wherein the information relating to signals between selected infrastructure nodes may include average and peak interference levels measured by the selected infrastructure nodes when the respective selected infrastructure nodes are not transmitting.

Example 210 may include the methods of any of Examples 203-7 and may further comprise optimizing allocation of frequency spots for the mobile network operators to reduce interference.

Example 211 may include the methods of any of Examples 203-7 and may further comprise adjusting power levels of one or more of the selected infrastructure nodes.

Example 212 may include the methods of any of Examples 203-11, wherein signal information and determination of interference metrics is performed by the aggregation node with reference to groups of infrastructure nodes.

Example 213 may include the method of Example 212, further including determination of the groups such that interference between group members is minimized.

Example 214 may include the method of Example 212, further include determination of the groups such that members of a group are allocated different spectra.

Example 215 may include the methods of any of Examples 203-14 wherein the aggregation node is or includes a Spectrum Access System (SAS).

Example 216 may include a method performed by an infrastructure node in an LTE infrastructure to mitigate interference between mobile network operators. The method may include determining signal information between the infrastructure node and one or more other infrastructure nodes. The method may also include providing the determined signal information to an aggregator node for determination of one or more interference metrics relating to the infrastructure node and the other infrastructure nodes.

Example 217 may include the method of Example 216 wherein determining signal information is performed in response to receipt of one or more triggers from the aggregator node.

Example 218 may include the method of Example 216 wherein determining signal information is performed in response to a decision by a network including or interacting with the infrastructure node.

Example 219 may include the method of any of Examples 216-18, further including determining, by the infrastructure node, the one or more other infrastructure nodes.

Example 220 may include the method of Example 219, wherein determining the one or more other infrastructure nodes may include determination of neighboring infrastructure nodes.

Example 221 may include the method of any of Examples 216-18, wherein providing the determined signal information includes determining and providing the one or more interface metrics.

Example 222 may include the method of Example 221, wherein determining the one or more interface metrics comprises determining the one or more interface metrics during a dedicated time phase for interference metric determination.

Example 223 may include the method of Example 222, further including silencing transmission from the infrastructure node during determination of interference metrics by other infrastructure nodes.

Example 224 may include the methods of any of Examples 216-23, wherein determining signal information includes determining signal information between groups of infrastructure nodes.

Example 225 may include the method of any of Examples 216-24, wherein the aggregator node is included a Spectrum Access System (SAS) node.

Example 226 may include a method performed by a user equipment (UE) in an LTE infrastructure to mitigate interference between mobile network operators. The method may include receiving a trigger from an aggregator node that interference metrics are being determined, and participating in determination of signal information by infrastructure nodes of the LTE infrastructure to be used for determination of interference metrics by the aggregator node.

Example 227 may include the method of Example 226, wherein participating may include silencing transmission from the UE during determination of the signal information.

Example 228 may include the method of Example 226, wherein participating may include measurement of the signal information.

Example 229 may include an apparatus comprising radio frequency (RF) circuitry to receive and transmit signals. The apparatus may also include baseband circuitry coupled with the RF circuitry, the baseband circuitry to issue requests for signal power and interference information measured between infrastructure nodes. The baseband circuitry may also be to produce metrics measure inter-node interference.

Example 230 may include the apparatus of Example 229, wherein the metrics are radio access technology agnostic.

Example 231 may include the apparatus of Example 229, wherein the metrics are radio access technology specific.

Example 232 may include the apparatus of any of Examples 229-31, wherein the signal power and interference information may include one or more of geographic area description information, information on propagation characteristics, and output power levels.

Example 233 may include the apparatus of any of Examples 229-31 wherein determining metrics may include performing the sum $$I_p = \sum \frac{P_t G_t G_r \lambda^2}{(4\pi)^2 d^n L},$$

wherein Pt is transmission power, Gt is the transmission antenna gain, Gr is the receiving antenna gain, λ is transmission wavelength, d is the distance between the transmission and reception, n is a path loss coefficient, and L is a system loss factor.

Example 234 may include the apparatus of any of Examples 229-33, wherein determining metrics may include receiving metrics measured by the infrastructure nodes.

Example 235 may include the apparatus of any of Examples 229-33, wherein the signal power and interference information may include average and peak interference levels measured by the infrastructure nodes when the respective infrastructure nodes are not transmitting.

Example 236 may include the apparatus of any of Examples 229-33 wherein the baseband circuitry may further be to optimize allocation of frequency spots for the mobile network operators.

Example 237 may include the apparatus of any of Examples 229-33 wherein the baseband circuitry may further be to adjust power levels of one or more of the infrastructure nodes.

Example 238 may include the apparatus of any of Examples 229-37, wherein the baseband circuitry is to produce metrics is with reference to groups of infrastructure nodes.

Example 239 may include the apparatus of Example 238, wherein the baseband circuitry may further be to determine the groups such that interference between group members is minimized.

Example 240 may include the apparatus of Example 238, wherein the baseband circuitry may further be to determine the groups such that members of a group are allocated different spectra.

Example 241 may include the apparatus of any of Examples 229-40 wherein the apparatus includes a Spectrum Access System (SAS).

Example 242 may include an apparatus comprising radio frequency (RF) circuitry to receive and transmit signals. The apparatus may also include baseband circuitry coupled with the RF circuitry, the baseband circuitry to measure signal power and interference information between the apparatus and one or more infrastructure nodes. The baseband circuitry may also be to provide the determined information to an aggregator node for determination of one or more inter-node interference metrics.

Example 243 may include the apparatus of Example 242 wherein the baseband circuitry is to determine signal power and interference information in response to receipt of one or more triggers from the aggregator node.

Example 244 may include the apparatus of Example 243 wherein the baseband circuitry is to determine signal power and interference information in response to a decision by a network including or interacting with the apparatus.

Example 245 may include the apparatus of any of Examples 242-44, wherein the baseband circuitry is further to select the one or more infrastructure nodes.

Example 246 may include the apparatus of Example 245, wherein determine the one or more infrastructure nodes may include determine neighboring infrastructure nodes.

Example 247 may include the apparatus of any of Examples 242-44, wherein provide the determined information includes determine and provide the one or more inter-node interface metrics.

Example 248 may include the apparatus of Example 247, wherein determine the one or more inter-node interface metrics comprises determine the one or more inter-node interface metrics during a dedicated time phase for inter-node interference metric determination.

Example 249 may include the apparatus of Example 248, wherein the baseband circuitry may further be to silence transmission by the RF circuitry during determination of inter-node interference metrics by the one or more infrastructure nodes.

Example 250 may include the apparatus of any of Examples 242-49, wherein determine signal power and interference information includes determine signal power and interference information between groups of infrastructure nodes.

Example 251 may include the apparatus of any of Examples 242-49, wherein the aggregator node is a Spectrum Access System (SAS) node.

Example 252 may include an apparatus comprising radio frequency (RF) circuitry to receive and transmit signals and to receive a trigger from an aggregator node that inter-node interference metrics are being determined. The apparatus may also include baseband circuitry coupled with the RF circuitry, the baseband circuitry to facilitate determination of signal power and interference information by infrastructure nodes of an LTE infrastructure.

Example 252 may include the apparatus of Example 252, wherein facilitate determination may include causing the RF circuitry to silence transmission from the apparatus during determination of the signal power and interference information.

Example 253 may include the apparatus of Example 252, wherein facilitate determination may include measure of the signal power and interference information.

Example 254 may include an apparatus comprising means to perform one or more elements of a method described in or related to any of Examples 203-28, or any other method or process described herein.

Example 255 may include one or more non-transitory computer-readable media comprising instructions to cause an electronic device, upon execution of the instructions by one or more processors of the electronic device, to perform one or more elements of a method described in or related to any of Examples 203-28, or any other method or process described herein.

Example 256 may include an apparatus comprising logic, modules, and/or circuitry to perform one or more elements of a method described in or related to any of Examples 203-28, or any other method or process described herein.

Example 257 may include a method, technique, or process as described in or related to any of Examples 203-28, or portions or parts thereof.

Example 258 may include an apparatus comprising: one or more processors and one or more computer readable media comprising instructions that, when executed by the one or more processors, cause the one or more processors to perform the method, techniques, or process as described in or related to any of Examples 203-28, or portions thereof.

Example 259 may include a method of communicating in a wireless network as shown and described herein.

Example 260 may include a system for providing wireless communication as shown and described herein.

Example 261 may include a device for providing wireless communication as shown and described herein.

While the disclosure has been described respect to a limited number of embodiments, those skilled in the art will appreciate numerous modifications and variations there from. It is intended that the appended claims cover all such modifications and variations as fall within the true spirit and scope of this disclosure.

In the description herein, numerous specific details are set forth, such as examples of specific types of processors and system configurations, specific hardware structures, specific architectural and micro architectural details, specific register configurations, specific instruction types, specific system components, specific measurements/heights, specific processor pipeline stages and operation etc. in order to provide a thorough understanding of the disclosure. It will be apparent, however, that these specific details need not be employed to practice the embodiments of the disclosure. In other instances, well known components or methods, such as specific and alternative processor architectures, specific logic circuits/code for described algorithms, specific firmware code, specific interconnect operation, specific logic configurations, specific manufacturing techniques and materials, specific compiler implementations, specific expression of algorithms in code, specific power down and gating techniques/logic and other specific operational details of computer system have not been described in detail in order to avoid unnecessarily obscuring aspects of the disclosure.

Instructions used to program logic to perform embodiments of the disclosure can be stored within a memory in the system, such as DRAM, cache, flash memory, or other storage. Furthermore, the instructions can be distributed via a network or by way of other computer readable media. Thus a machine-readable medium may include any mechanism for storing or transmitting information in a form readable by a machine (e.g., a computer), but is not limited to, floppy diskettes, optical disks, Compact Disc, Read-Only Memory (CD-ROMs), and magneto-optical disks, Read-Only Memory (ROMs), Random Access Memory (RAM), Erasable Programmable Read-Only Memory (EPROM), Electrically Erasable Programmable Read-Only Memory (EEPROM), magnetic or optical cards, flash memory, or a tangible, machine-readable storage used in the transmission of information over the Internet via electrical, optical, acoustical or other forms of propagated signals (e.g., carrier waves, infrared signals, digital signals, etc.). Accordingly, the computer-readable medium includes any type of tangible machine-readable medium suitable for storing or transmitting electronic instructions or information in a form readable by a machine (e.g., a computer).

A module as used herein refers to any combination of hardware, software, and/or firmware. As an example, a module includes hardware, such as a micro-controller, associated with a non-transitory medium to store code to be executed by the micro-controller. Therefore, reference to a module, in one embodiment, refers to the hardware, which is specifically configured to recognize and/or execute the code to be held on a non-transitory medium. Furthermore, in another embodiment, use of a module refers to the non-transitory medium including the code, which is specifically adapted to be executed by the microcontroller to perform predetermined operations. And as can be inferred, in yet another embodiment, the term module (in this example) may refer to the combination of the microcontroller and the non-transitory medium. Often module boundaries that are illustrated as separate commonly vary and potentially overlap. For example, a first and a second module may share hardware, software, firmware, or a combination thereof, while potentially retaining some independent hardware, software, or firmware. In one embodiment, use of the term logic includes hardware, such as transistors, registers, or other hardware, such as programmable logic devices.

Use of the phrase 'configured to,' in one embodiment, refers to arranging, putting together, manufacturing, offering to sell, importing and/or designing an apparatus, hardware, logic, or element to perform a designated or determined task. In this example, an apparatus or element thereof that is not operating is still 'configured to' perform a designated task if it is designed, coupled, and/or interconnected to perform said designated task. As a purely illustrative example, a logic gate may provide a 0 or a 1 during operation. But a logic gate 'configured to' provide an enable signal to a clock does not include every potential logic gate that may provide a 1 or 0. Instead, the logic gate is one coupled in some manner that during operation the 1 or 0 output is to enable the clock. Note once again that use of the term 'configured to' does not require operation, but instead focuses on the latent state of an apparatus, hardware, and/or element, where in the latent state the apparatus, hardware, and/or element is designed to perform a particular task when the apparatus, hardware, and/or element is operating.

Furthermore, use of the phrases 'to,' 'capable of/to,' and or 'operable to,' in one embodiment, refers to some apparatus, logic, hardware, and/or element designed in such a way to enable use of the apparatus, logic, hardware, and/or element in a specified manner. Note as above that use of to, capable to, or operable to, in one embodiment, refers to the latent state of an apparatus, logic, hardware, and/or element, where the apparatus, logic, hardware, and/or element is not operating but is designed in such a manner to enable use of an apparatus in a specified manner.

The embodiments of methods, hardware, software, firmware or code set forth above may be implemented via instructions or code stored on a machine-accessible, machine readable, computer accessible, or computer readable medium which are executable by a processing element. A non-transitory machine-accessible/readable medium includes any mechanism that provides (i.e., stores and/or transmits) information in a form readable by a machine, such as a computer or electronic system. For example, a non-transitory machine-accessible medium includes random-access memory (RAM), such as static RAM (SRAM) or dynamic RAM (DRAM); ROM; magnetic or optical storage medium; flash memory devices; electrical storage devices; optical storage devices; acoustical storage devices; other form of storage devices for holding information received from transitory (propagated) signals (e.g., carrier waves, infrared signals, digital signals); etc., which are to be distinguished from the non-transitory mediums that may receive information there from.

Instructions used to program logic to perform embodiments of the disclosure may be stored within a memory in the system, such as DRAM, cache, flash memory, or other storage. Furthermore, the instructions can be distributed via a network or by way of other computer readable medium. Thus a machine-readable medium may include any mechanism for storing or transmitting information in a form readable by a machine (e.g., a computer), but is not limited to, floppy diskettes, optical disks, Compact Disc, Read-Only Memory (CD-ROMs), and magneto-optical disks, Read-Only Memory (ROMs), Random Access Memory (RAM), Erasable Programmable Read-Only Memory (EPROM), Electrically Erasable Programmable Read-Only Memory (EEPROM), magnetic or optical cards, flash memory, or a tangible, machine-readable storage used in the transmission of information over the Internet via electrical, optical, acoustical or other forms of propagated signals (e.g., carrier waves, infrared signals, digital signals, etc.). Accordingly, the computer-readable medium includes any type of tangible machine-readable medium suitable for storing or transmitting electronic instructions or information in a form readable by a machine (e.g., a computer)

Reference throughout this specification to "one embodiment" or "an embodiment" means that a particular feature, structure, or characteristic described in connection with the embodiment is included in at least one embodiment of the disclosure. Thus, the appearances of the phrases "in one embodiment" or "in an embodiment" on "in some embodiments" in various places throughout this specification are not necessarily all referring to the same embodiment. Furthermore, the particular features, structures, or characteristics may be combined in any suitable manner in one or more embodiments.

In the foregoing specification, a detailed description has been given with reference to specific exemplary embodiments. It will, however, be evident that various modifications and changes may be made thereto without departing from the broader spirit and scope of the disclosure as set forth in the appended claims. The specification and drawings are, accordingly, to be regarded in an illustrative sense rather than a restrictive sense. Furthermore, the foregoing use of embodiment and other exemplarily language does not necessarily refer to the same embodiment or the same example, but may refer to different and distinct embodiments, as well as potentially the same embodiment.

Some portions of the detailed description are presented in terms of algorithms and symbolic representations of operations on data hits within a computer memory. These algorithmic descriptions and representations are the means used by those skilled in the data processing arts to most effectively convey the substance of their work to others skilled in the art. An algorithm is here and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared and otherwise manipulated. It has proven convenient at times, principally for reasons of common usage, to refer to these signals as bits, values, elements, symbols, characters, terms, numbers or the like. The blocks described herein can be hardware, software, firmware or a combination thereof.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "identifying," "receiving," "determining," "issuing," "providing," "measuring," "executing," "requesting," "communicating," or the like, refer to the actions and processes of a computing system, or similar electronic computing device, that manipulates and transforms data represented as physical (e.g., electronic) quantities within the computing system's registers and memories into other data similarly represented as physical quantities within the computing system memories or registers or other such information storage, transmission or display devices.

The words "example" or "exemplary" are used herein to mean serving as an example, instance or illustration. Any aspect or design described herein as "example' or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or." That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an embodiment" or "one embodiment" or "an implementation" or "one implementation" throughout is not intended to mean the same embodiment or implementation unless described as such. Also, the terms "first," "second." "third," "fourth," etc. as used herein are meant as labels to distinguish among different elements and may not necessarily have an ordinal meaning according to their numerical designation.

In the foregoing specification, a detailed description has been given with reference to specific exemplary embodiments. It will, however, be evident that various modifications and changes may be made thereto without departing from the broader spirit and scope of the disclosure as set forth in the appended claims. The specification and drawings are, accordingly, to be regarded in an illustrative sense rather than a restrictive sense. Furthermore, the foregoing use of embodiment and other exemplarily language does not necessarily refer to the same embodiment or the same example, but may refer to different and distinct embodiments, as well as potentially the same embodiment.

What is claimed is:

1. An apparatus, comprising:
one or more processors, wherein the one or more processors are configured to cause a first infrastructure component of a cellular network to:
    generate an interference metric associated with a first group of a plurality of groups of infrastructure components of one or more cellular networks based on measurement information, wherein the measurement information includes measurements related to the transmission of a predefined sequence associated with the first group of the plurality of groups of infrastructure components, wherein the infrastructure components of the first group simultaneously transmit the predefined sequence associated with the first group; and
    transmit a predefined sequence associated with a second group of the plurality of groups of infrastructure components.

2. The apparatus of claim 1, Wherein the one or more processors are further configured to cause the first infrastructure component of the cellular network to:
    transmit the interference metric to a second infrastructure component.

3. The apparatus of claim 2, wherein the second infrastructure component is an aggregation node.

4. The apparatus of claim 1, wherein the first infrastructure component is a base station.

5. The apparatus of claim 1, wherein transmitting die predefined sequence associated with the second group is performed simultaneously with other infrastructure nodes of the second group.

6. The apparatus of claim 5, wherein the predefined sequence associated with the second group is different than the predefined sequence associated with the first group.

7. The apparatus of claim 1, Wherein the predefined sequence associated with the first group includes a training sequence.

8. The apparatus of claim 1, wherein the processor is further configured to:
    determine configuration settings for the first infrastructure component based on the interference metric.

9. The apparatus of claim 1, wherein the processor is further configured to cause the first infrastructure component of the cellular network to:
    determine configuration settings for the base station based on interference caused by transmitting the predefined sequence associated with the second group.

10. A method for operating a first infrastructure component of a cellular network, including:
by the first infrastructure component:
    generating an interference metric associated with a first group of a plurality of groups of infrastructure components of one or more cellular networks based on measurement information, wherein the measurement information includes measurements related to the transmission of a predefined sequence associated with the first group of the plurality of groups of infrastructure components, wherein the infrastructure components of the first group simultaneously transmit the predefined sequence associated with the first group; and
    transmitting a predefined sequence associated with a second group of the plurality of groups of infrastructure components.

11. The method of claim 10, further comprising:
    transmitting the interference metric to a second infrastructure component.

12. The method of claim 11, wherein the second infrastructure component is an aggregation node.

13. The method of claim 10, wherein the first infrastructure component is a base station.

14. The method of claim 10, wherein transmitting the predefined sequence associated with the second group is performed simultaneously with other infrastructure nodes of the second group.

15. The method of claim 10, wherein the predefined sequence associated with the second group is different than the predefined sequence associated with the first group.

16. A cellular network, comprising:
a first infrastructure component;
a first group of infrastructure components; and
a second group of infrastructure components;
wherein the first group of infrastructure nodes are configured to:
    simultaneously transmit a predefined sequence associated with the first group of infrastructure components;
wherein the first infrastructure component is configured to:
    generate an interference metric associated with the first group of infrastructure components based on measurement information, wherein the measurement information includes measurements related to the transmission of the predefined sequence associated with the first group of infrastructure components; and
    transmit a predefined sequence associated with a second group of infrastructure components.

17. The cellular network of claim 16, wherein the first infrastructure component is configured to:
    transmit the interference metric to a second infrastructure component.

18. The cellular network of claim 17, wherein the second infrastructure component is an aggregation node.

19. The cellular network of claim 16, wherein the first infrastructure component is a base station.

20. The cellular network of claim 19, wherein the first infrastructure component is further configured to:
    determine configuration settings for the base station based on interference caused by transmitting the predefined sequence associated with the second group.

* * * * *